United States Patent
Varadarajan et al.

(10) Patent No.: US 11,816,084 B2
(45) Date of Patent: Nov. 14, 2023

(54) STAGING ANCHOR TREES FOR IMPROVED CONCURRENCY AND PERFORMANCE IN PAGE RANGE INDEX MANAGEMENT

(71) Applicant: Microsoft Technology Licensing, LLC, Redmond, WA (US)

(72) Inventors: Krishnan Varadarajan, Redmond, WA (US); Jegan Devaraju, Redmond, WA (US); Shane Mainali, Duvall, WA (US); Quan Zhang, Kenmore, WA (US); Sridhar Srinivasan, Shanghai (CN); Bin Tong, Bellevue, WA (US); He Su, Shanghai (CN); Ju Wang, Cupertino, CA (US); Manish Chablani, Redmond, WA (US); Hao Feng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/894,925

(22) Filed: Aug. 24, 2022

(65) Prior Publication Data
US 2022/0405262 A1    Dec. 22, 2022

Related U.S. Application Data

(63) Continuation of application No. 16/617,432, filed as application No. PCT/CN2017/091091 on Jun. 30, 2017, now Pat. No. 11,487,734.

(51) Int. Cl.
*G06F 16/22* (2019.01)
*G06F 16/215* (2019.01)
*G06F 7/14* (2006.01)

(52) U.S. Cl.
CPC ............ *G06F 16/2272* (2019.01); *G06F 7/14* (2013.01); *G06F 16/215* (2019.01); *G06F 16/2246* (2019.01); *G06F 16/2282* (2019.01)

(58) Field of Classification Search
CPC ............ G06F 16/2272; G06F 16/2246; G06F 16/2282; G06F 16/215; G06F 7/14
See application file for complete search history.

(56) References Cited

U.S. PATENT DOCUMENTS

| | | |
|---|---|---|
| 5,717,924 A | 2/1998 | Kawai |
| 11,249,961 B2 | 2/2022 | Varadarajan et al. |

(Continued)

OTHER PUBLICATIONS

"Non Final Office Action Issued in U.S. Appl. No. 17/567,633", dated Oct. 18, 2022, 29 Pages.

(Continued)

*Primary Examiner* — Huawen A Peng
(74) *Attorney, Agent, or Firm* — WORKMAN NYDEGGER

(57) ABSTRACT

Anchor tree cross-merge within a distributed storage system. A computer system identifies a data structure that includes (i) a root anchor tree and (ii) an ordered set of anchor trees that are ordered based on their creation, such that a last anchor tree of the ordered set of anchor trees is most-recently created. The data structure stores index data for a set of objects stored in a non-volatile storage. The computer system creates a new anchor tree in the ordered set of anchor trees. The computer system identifies, from a set of delta tables, index data representing one or more objects that are stored on the non-volatile storage. The computer system merges the index data representing the one or more objects into the new anchor tree.

20 Claims, 22 Drawing Sheets

(56) References Cited

U.S. PATENT DOCUMENTS

| | | |
|---|---|---|
| 2006/0206507 A1 | 9/2006 | Dahbour et al. |
| 2008/0228802 A1 | 9/2008 | Marshall |
| 2012/0117067 A1* | 5/2012 | Yakubovich ........ G06F 16/2246 707/E17.014 |
| 2012/0166402 A1 | 6/2012 | Pederson et al. |
| 2013/0346725 A1* | 12/2013 | Lomet ................ G06F 12/0804 711/206 |
| 2014/0074841 A1* | 3/2014 | Majnemer ........... G06F 16/2246 707/E17.002 |
| 2014/0279961 A1* | 9/2014 | Schreter ............. G06F 3/0673 707/693 |
| 2016/0210053 A1* | 7/2016 | Frank .................. G06F 3/0631 |
| 2017/0052717 A1* | 2/2017 | Rawat ................ G06F 16/2246 |
| 2017/0188187 A1 | 6/2017 | Marsh et al. |
| 2017/0357680 A1* | 12/2017 | Mackovitch ........... G06F 16/23 |
| 2018/0150544 A1 | 5/2018 | Bensberg et al. |
| 2018/0349095 A1* | 12/2018 | Wu ..................... G06F 3/0643 |

OTHER PUBLICATIONS

"Office Action Issued in European Patent Application No. 17915803.5", dated Oct. 6, 2022, 7 Pages.

"Notice of Allowance Issued in European Patent Application No. 17915830.8", dated Nov. 7, 2022, 9 Pages.

U.S. Appl. No. 16/617,432, filed Jun. 30, 2017.

U.S. Appl. No. 17/567,633, filed Jan. 3, 2022.

U.S. Appl. No. 16/617,443, filed Jun. 30, 2017.

"Final Office Action Issued in U.S. Appl. No. 17/567,633", dated Apr. 3, 2023, 31 Pages.

"Notice of Allowance Issued in European Patent Application No. 1795830.8", dated Feb. 16, 2023, 2 Pages.

\* cited by examiner

STAGING ANCHOR TREES FOR IMPROVED CONCURRENCY AND PERFORMANCE IN PAGE RANGE INDEX MANAGEMENT

CLAIM FOR PRIORITY

The present application is a continuation of U.S. Ser. No. 16/617,432, filed Nov. 26, 2019, entitled "STAGING ANCHOR TREES FOR IMPROVED CONCURRENCY AND PERFORMANCE IN PAGE RANGE INDEX MANAGEMENT," which is a national stage filing under 35 U.S.C 371 of PCT application number PCT/CN2017/091091, having an international filing date of Jun. 30, 2017. The disclosures of each of the foregoing applications are hereby incorporated by reference in their entireties.

FIELD

The present disclosure relates to index management for range-defined data and more particularly to systems, data structures, and methods of accommodating updates to an index.

BACKGROUND

A distributed storage system may allow customers to store object data, such as images. The cloud storage system may also allow customers to store range-defined data. For example, the cloud storage system may offer storage that appears as a virtual disk (also called a virtual hard drive) to a virtual machine. The virtual machine may be instantiated in a cloud computing system operated by the operator of the cloud storage system.

When the virtual machine writes data to the virtual disk, the cloud storage system stores the data and maintains an index of which ranges of addresses have been stored. Over time, as more and more ranges of addresses, some of which overlap, are written to the virtual hard drive, the size of the index increases. The index may be maintained in a tree data structure, such as a B+ tree.

Certain storage use cases, such as storage representing a virtual disk, may have random read/write access patterns. Because of this, random access time is a concern and the index needs to be highly structured to reduce access time. In other words, additional address ranges cannot be added to the index simply by appending them to the end of the index. Instead, to reduce retrieval time, substantial portions of the index may need to be adjusted to accommodate new address ranges.

In various implementations, a form of write caching may be used, where new sets of addresses are stored in temporary data structures and later merged into the main index. However, merging the temporary data structures into the main index may still require substantial rewriting of the main index. In fact, merging a relatively small number of updates into a large index can result in huge write amplification. Further, an index may have billions of address ranges, meaning that write amplification imposes a significant computing cost.

The underlying data pointed to by the index may also need to be updated over time. Garbage collection is the process by which obsolete data is released for other uses. While a merge of a temporary set of address ranges is being performed on the index, however, garbage collection may be blocked. Further, while garage collection is occurring, merging may be blocked. The amount of time that merging is blocked may be significant because garbage collection may need to scan the entire index and rewrite underlying data during that process.

In order to perform a copy operation, such as to copy a virtual disk for use in a newly-instantiated virtual machine, the temporary store of address ranges may need to be merged into the main index. For infrastructure-as-a-service, this copy may be a critical path in deployment and/or scaling, so any ongoing garbage collection may be aborted to allow the merge to take place. If garbage collection fails prior to completion, some or all of the work performed by garbage collection may need to be redone. Redoing garbage collection is costly in terms of processing power. In addition, if a copy command is run frequently enough, garbage collection may never complete.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In some aspects, the techniques described herein relate to a method, implemented at a computer system that includes a processor, for performing a cross-merge within a distributed storage system, the method including: identifying a data structure that includes (i) a root anchor tree and (ii) an ordered set of anchor trees that are ordered based on their creation, such that a last anchor tree of the ordered set of anchor trees is most-recently created, the data structure storing index data for a set of objects stored in a non-volatile storage; creating a new anchor tree in the ordered set of anchor trees; identifying, from a set of delta tables, index data representing one or more objects that are stored on the non-volatile storage; and merging the index data representing the one or more objects into the new anchor tree.

In some aspects, the techniques described herein relate to a computer system, including: a processor; and a computer-readable medium including processor-executable instructions that are executable by the processor to cause the computer system to at least: identify a data structure that includes (i) a root anchor tree and (ii) an ordered set of anchor trees that are ordered based on their creation, such that a last anchor tree of the ordered set of anchor trees is most-recently created, the data structure storing index data for a set of objects stored in a non-volatile storage; create a new anchor tree in the ordered set of anchor trees; identify, from a set of delta tables, index data representing one or more objects that are stored on the non-volatile storage; and merge the index data representing the one or more objects into the new anchor tree.

In some aspects, the techniques described herein relate to a computer-readable medium including processor-executable instructions that are executable by a processor to cause a computer system to at least: identify a data structure that includes (i) a root anchor tree and (ii) an ordered set of anchor trees that are ordered based on their creation, such that a last anchor tree of the ordered set of anchor trees is most-recently created, the data structure storing index data for a set of objects stored in a non-volatile storage; create a new anchor tree in the ordered set of anchor trees; identify, from a set of delta tables, index data representing one or more objects that are stored on the non-volatile storage; and merge the index data representing the one or more objects into the new anchor tree.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 2:
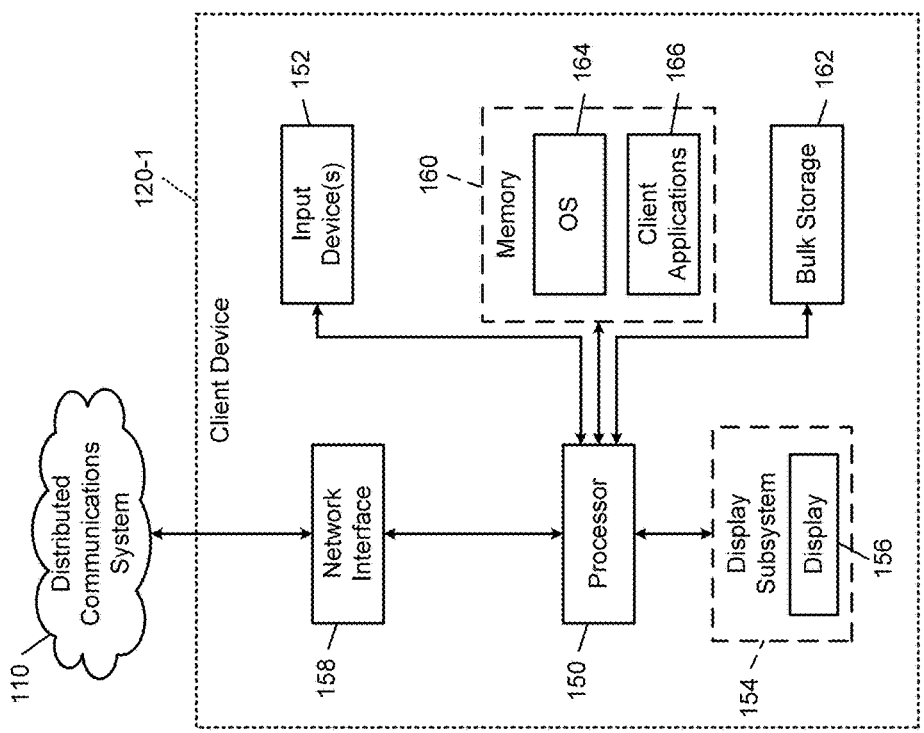
FIG. 2 is a functional block diagram of an example implementation of a client device executing applications that access cloud storage of the distributed computing system.

Cloud storage systems may provide a variety of storage offerings. For example, cloud storage systems may allow customers to store sets of files (called file sets below). The cloud storage system may then provide a standardized interface, such as server message block (SMB), to allow access to these files. Such file storage may be used when transitioning storage of files to the cloud but relying on applications that expect a standardized network interface, such as SMB. In this way, those applications may be hosted in the cloud without rewriting.

Cloud storage systems may also allow customers to store data identified by address range. For example, the cloud storage system may present an address-based interface to a virtual machine to emulate a hard drive. When storing file sets or address-defined data, the data may be indexed in a tree structure. For simplicity, in the discussion below, ranges of addresses will be discussed in the context of a virtual disk. However, the present disclosure applies to other storage offerings, such as file sets.

Over time, as a virtual machine writes data to a virtual disk, the address ranges of that written data become numerous. In fact, the number of address ranges may grow to be in the billions. Therefore, efficient indexing structures are implemented, such as log structured merge (LSM) trees and B+ trees. In the discussion below, the generic term anchor tree will be used to indicate the indexing structure, and the anchor tree may be implemented using, for example, an LSM tree or a B+ tree.

Prior to development of the present disclosure, a single anchor tree stored all of the address range entries in the index for a virtual disk. As described above, merging newly-written address ranges into a large anchor tree causes write amplification where one new address range entry causes rewriting of multiple address range entries in the anchor tree. In addition, merging new data into the anchor tree blocks garbage collection from running, which increases the amount of invalid data being stored that cannot be reallocated to storage of valid data. Further, garbage collection may block merging.

To address these problems, the present disclosure describes an anchor, which is a set of one or more anchor trees. When merging a set of new writes into the anchor, the merge process has the option of merging the writes into an existing anchor tree or creating a new anchor tree. Adding a set of new address ranges to a new anchor tree creates no write amplification. Further, if garbage collection is operating on the existing anchor tree, the merge operation can create a new anchor tree, allowing garbage collection to continue.

When a read request is received, all of the anchor trees in the anchor may need to be consulted, starting with the last anchor tree. As a result, the number of anchor trees should not grow unbounded. Therefore, the present disclosure defines a process called anchor merge that combines multiple anchor trees into a single anchor tree. Over time, anchor merge causes the number of anchor trees in an anchor to trend toward one, while additional writes cause the merge process to increase the number of anchor trees.

When a snapshot is taken, the data at the time of the snapshot will be retained. Therefore, the indexed data at that time will also be retained. The anchor (set of anchor trees) for what is now the prior version of the storage index is made read-only. However, if the previous anchor includes multiple anchor trees, anchor merge will continue to operate over time until a single anchor tree remains for that prior version. Meanwhile, in the present version of the index, anchor trees may be added to the anchor as index data for new writes is merged into the anchor.

Figure 9:
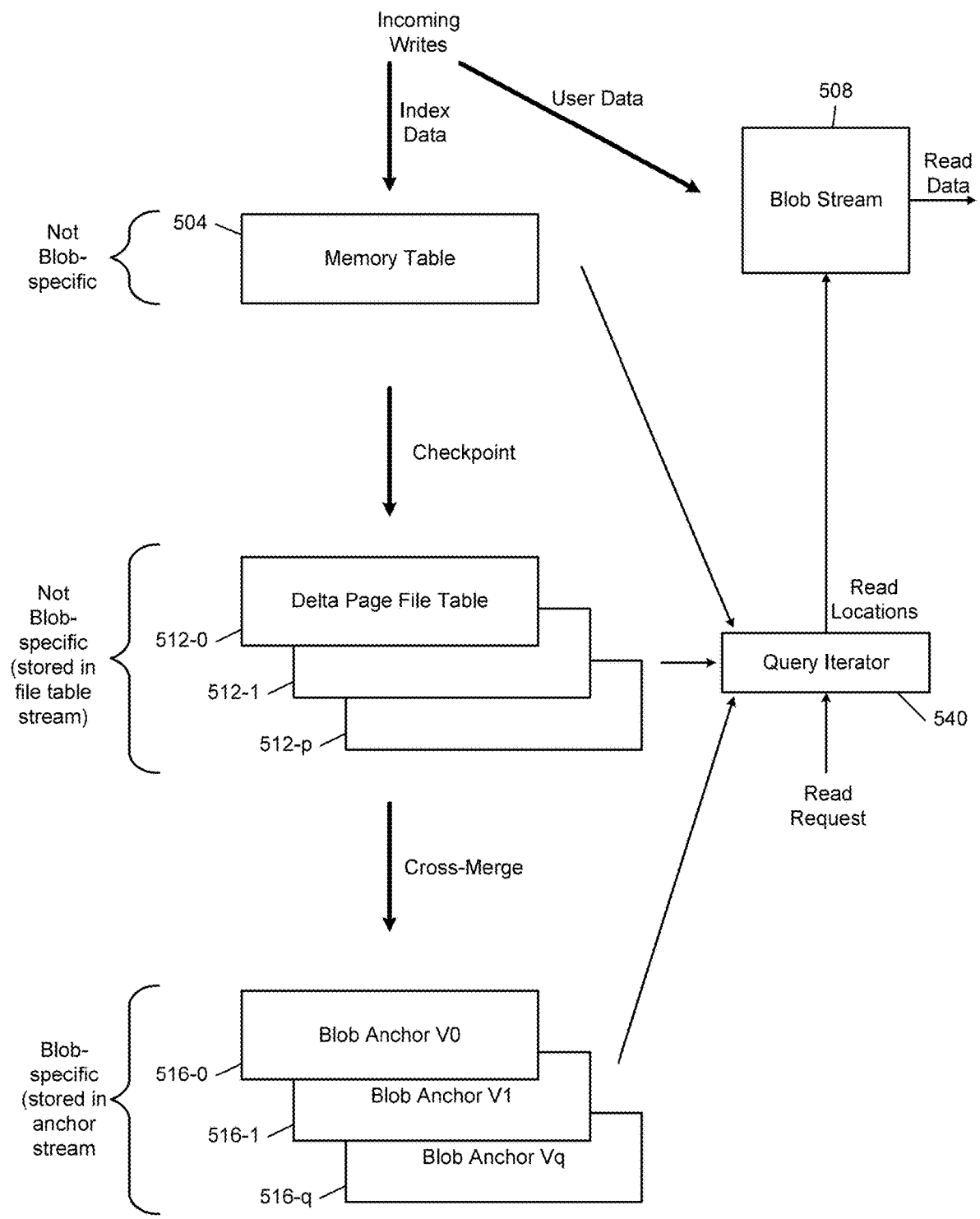
FIG. 9 is a high-level depiction of read and write operations in a cache index hierarchy.
Figure 10:
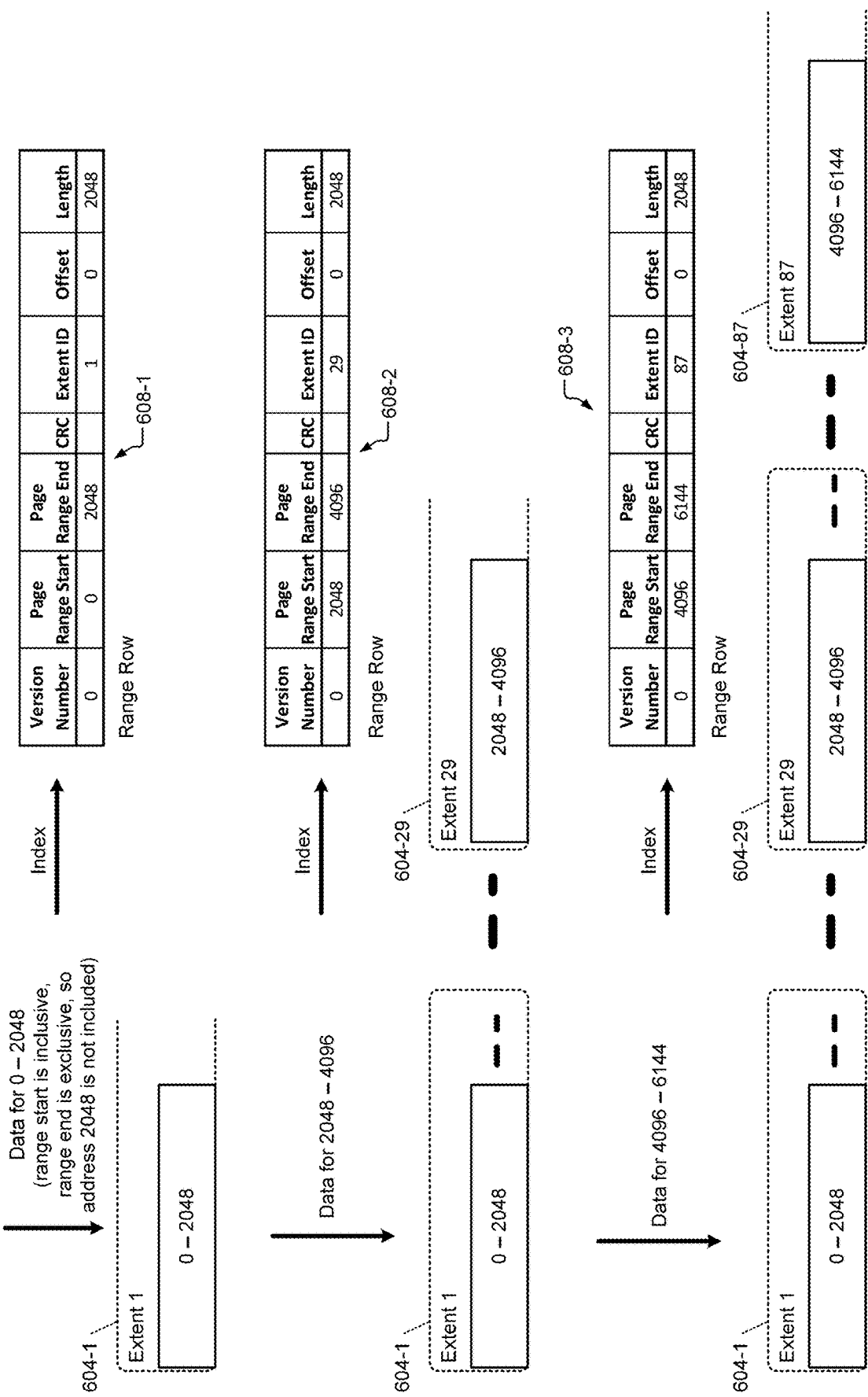
FIG. 10 is a simplified example of data being written to extent data structures while index entries are created.

FIGS. 1-8 describe how the cloud storage system stores index data and user data. FIG. 9 provides an overview of how index data for incoming writes may be cached in a memory table before being written to delta page file tables by a checkpoint process. These delta page file tables are then merged into anchors. Because of this cache hierarchy, read requests may need to consult each level of the index. FIG. 10 provides a very simple example of how write data and the corresponding index entries can be visually represented.

Figure 11B:
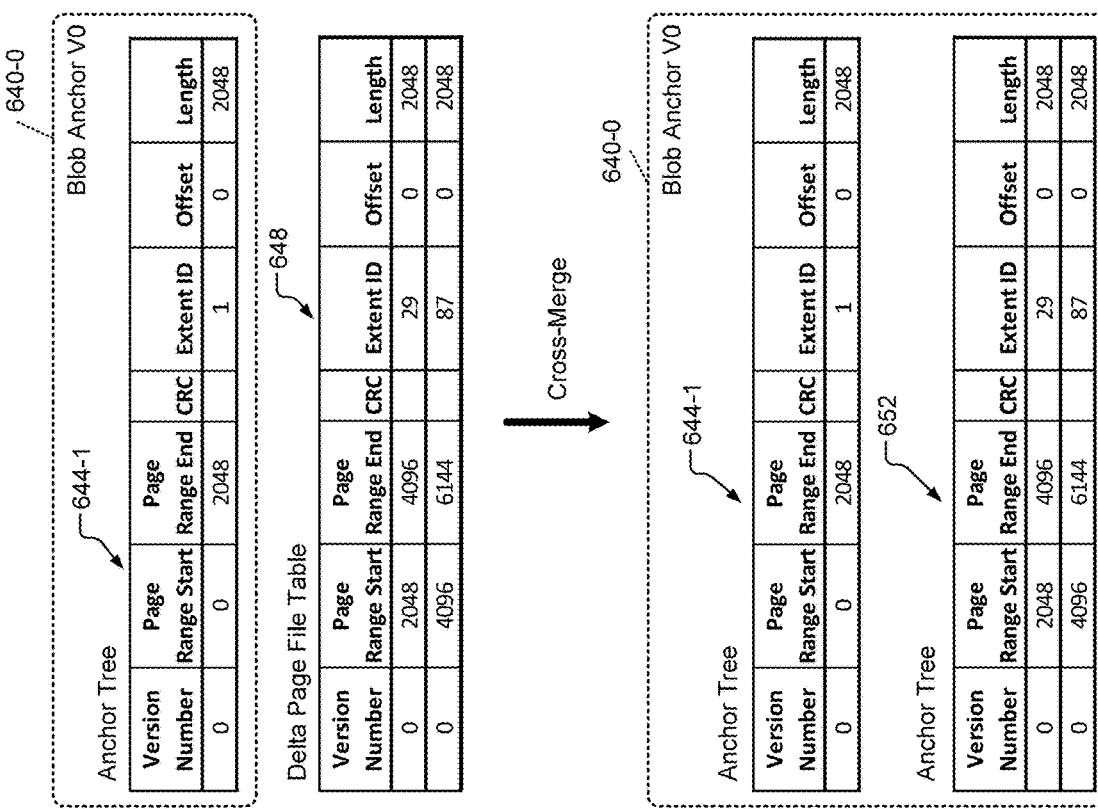
FIG. 11B is a graphical illustration of a simplified cross-merge operation in which an additional anchor tree is created.
Figure 11A:
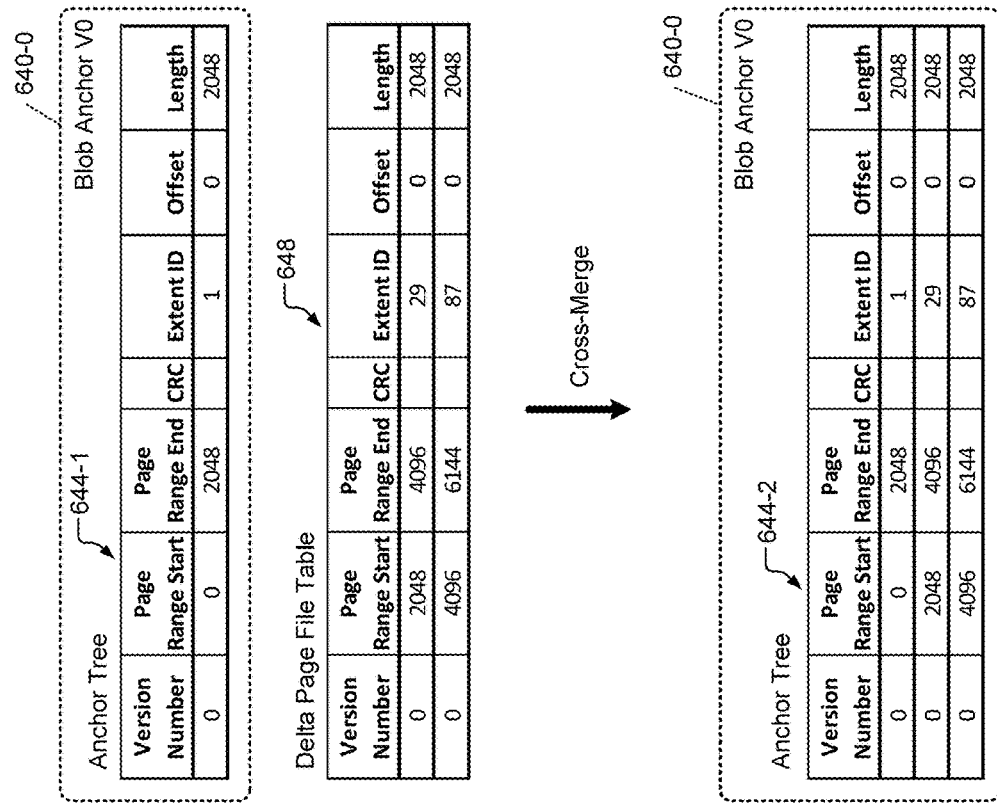
FIG. 11A is a graphical illustration of a simplified cross-merge operation.

FIGS. 11A and 11B depict very simple cross-merge operations where a new anchor tree is not created (FIG. 11A) or is created (FIG. 11B). For illustration, the anchor tree is shown with a single index entry, while the delta page file table is shown with two index entries. Merging three index entries would not require the present disclosure; however, when there are hundreds, thousands, or even billions of entries, the present disclosure offers substantial improvements in performance and storage efficiency.

Figure 12:
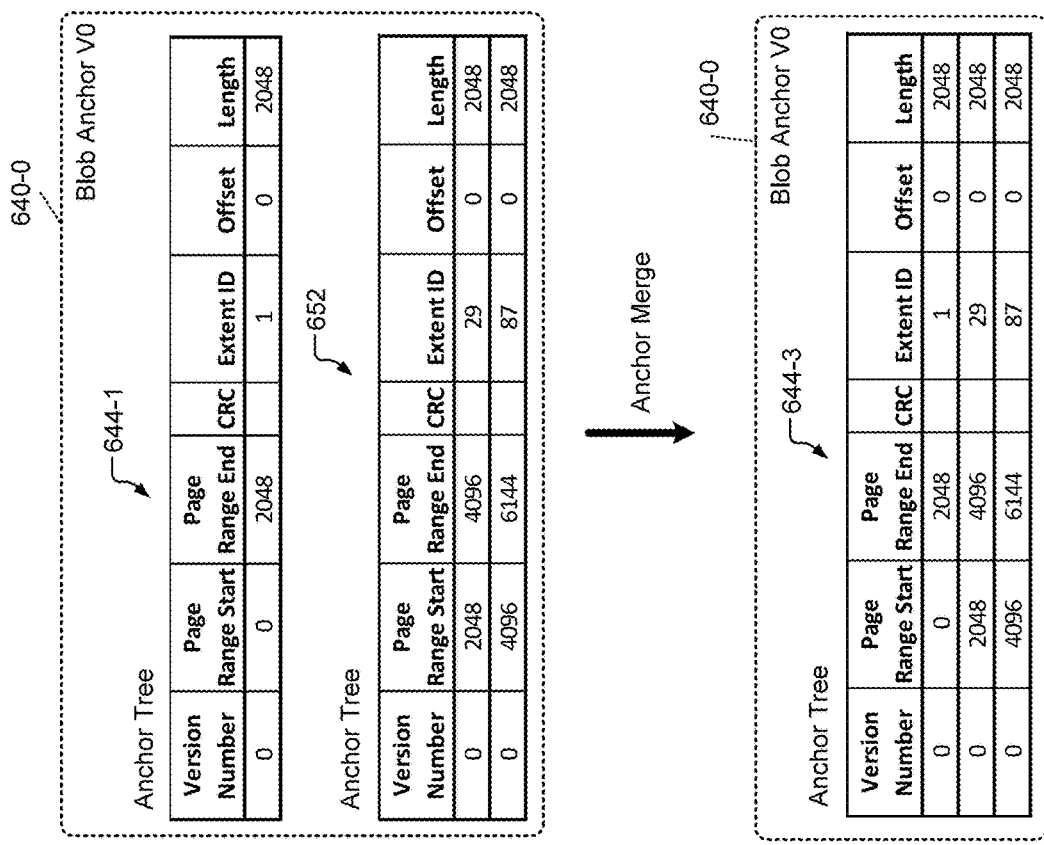
FIG. 12 is a graphical illustration of a simplified anchor merge operation to combine multiple anchor trees into a single anchor tree.
Figure 13:
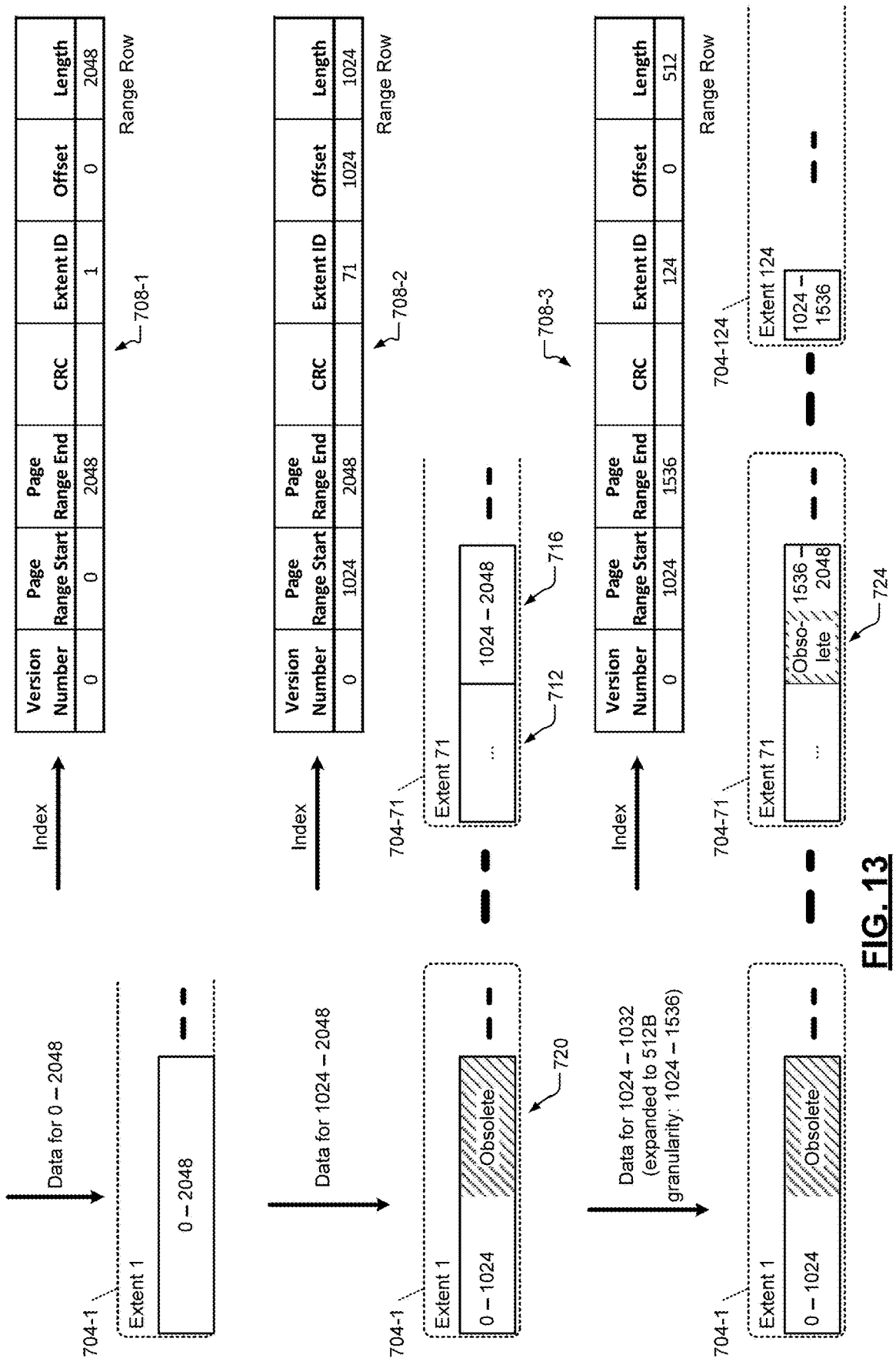
FIG. 13 is a graphical illustration of write data being stored in extent data structures and index entries being created, where the address ranges of the write data overlap.
Figures 14A, 14B:
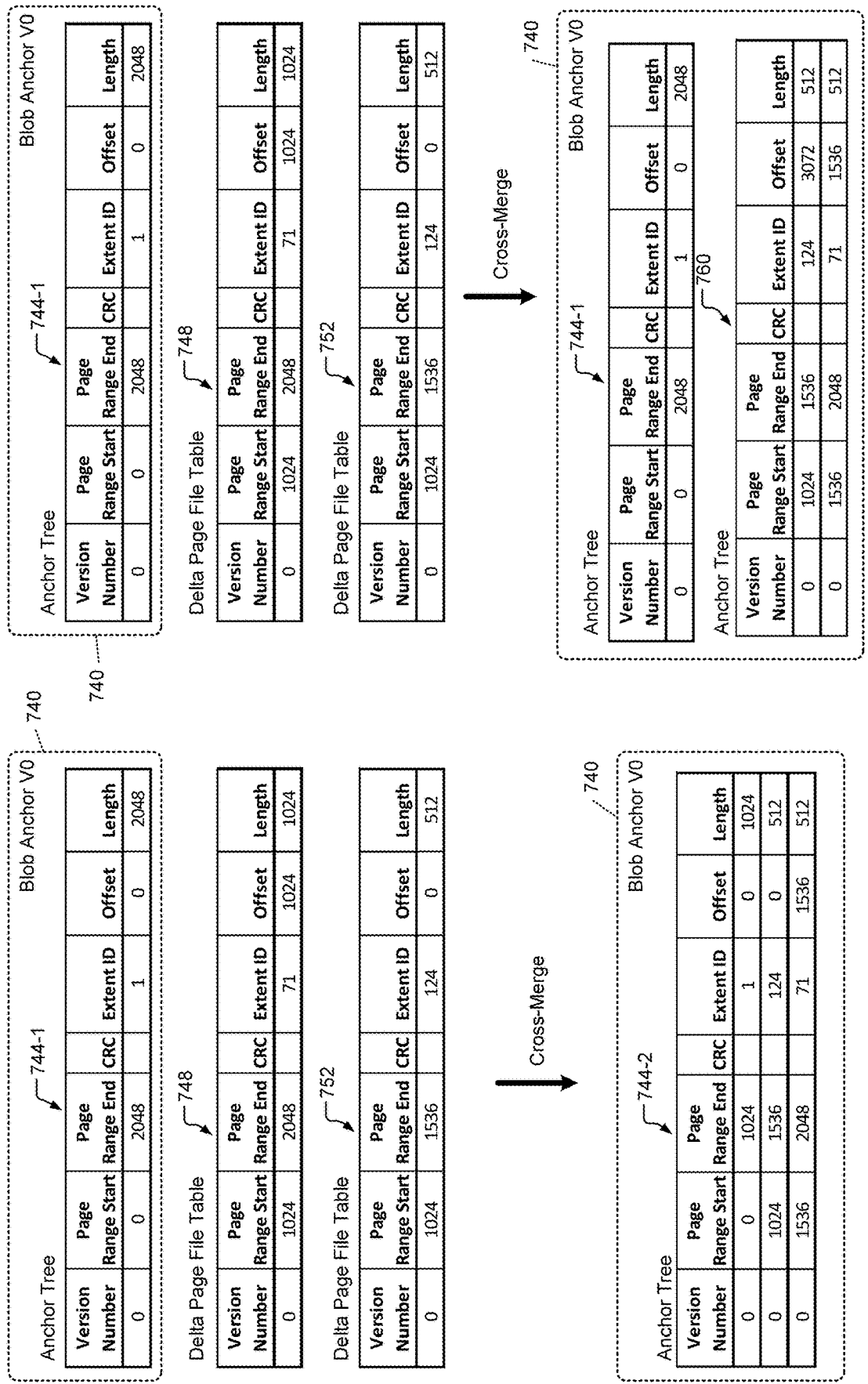
FIG. 14A is a graphical illustration of a simplified cross-merge operation in which overlapping address ranges are broken down.
FIG. 14B is a graphical illustration of an example cross-merge operation in which a new anchor tree is created.
Figure 15:
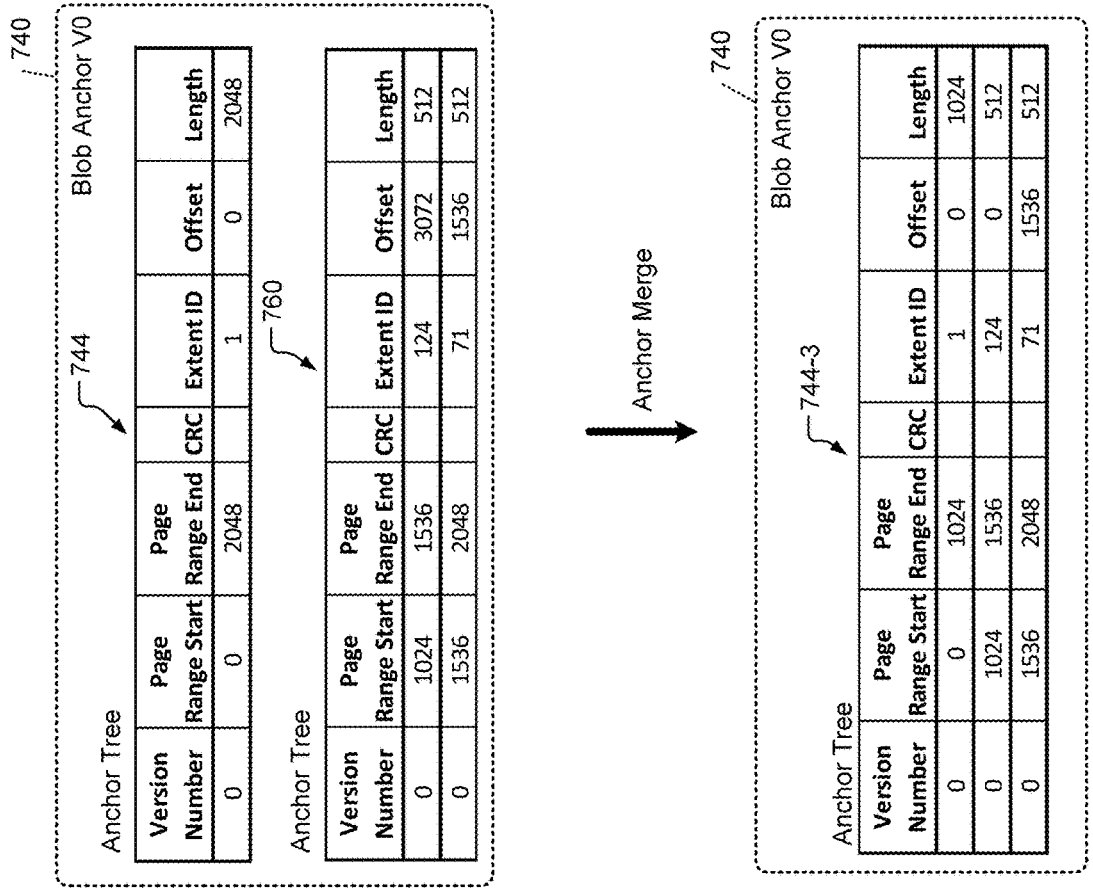
FIG. 15 is a graphical illustration of a simplified anchor merge in which address ranges of the anchor trees to be merged overlap.

FIG. 12 is an example of an anchor merge in which the two anchor trees of FIG. 11B are merged into a single anchor tree. For a slight increase in complexity, FIG. 13 depicts writes for which the address ranges overlap. FIGS. 14A and 14B depict how an anchor tree can be cross-merged with delta page file tables. When address ranges overlap, a process called range breakdown is performed in which the overlapping range of addresses is cut out from the earlier address range. FIG. 15 shows how range breakdown can occur during an anchor merge.

Figure 16:
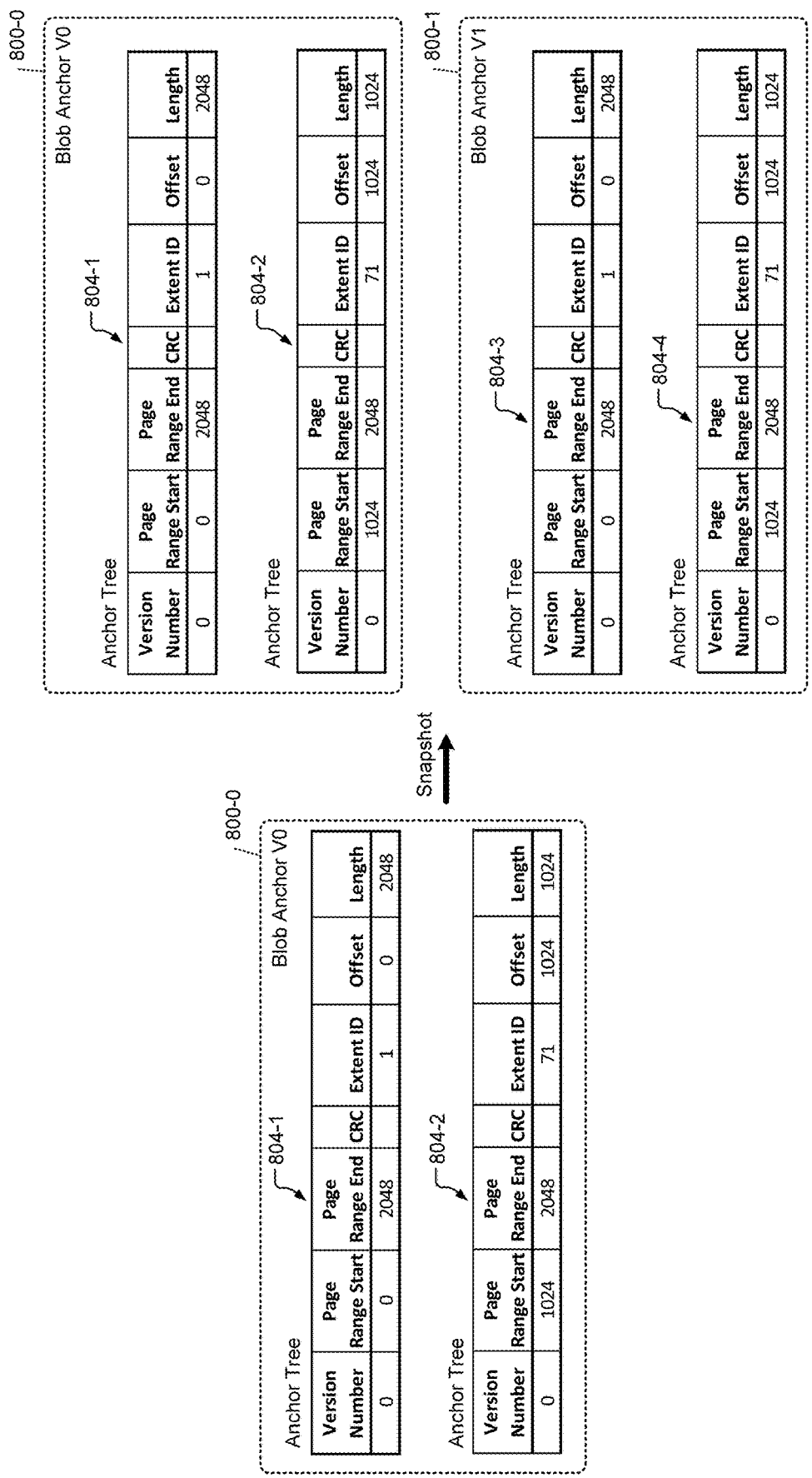
FIG. 16 is a graphical illustration of new anchor creation in response to a snapshot.
Figure 17:
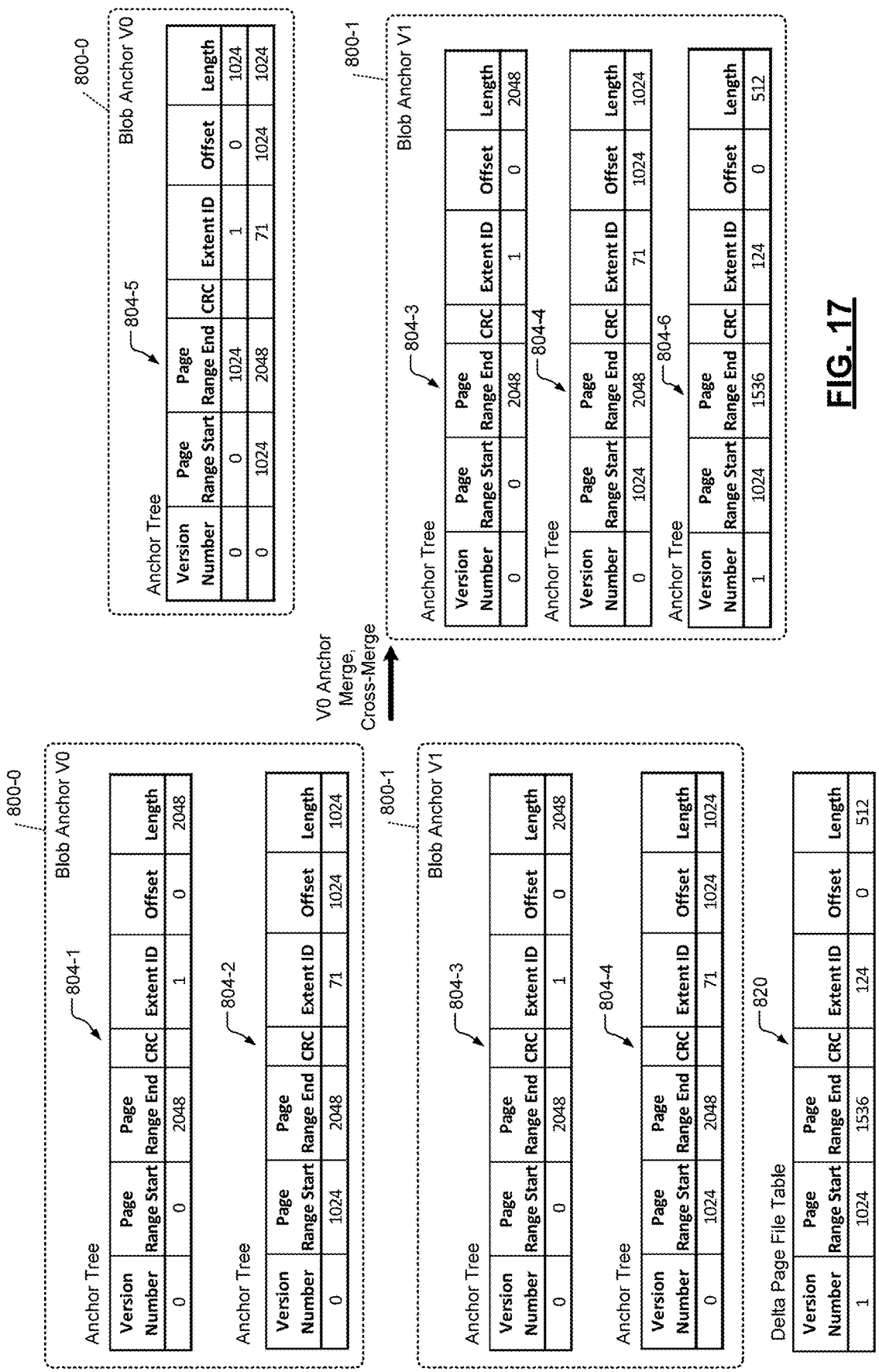
FIG. 17 is a graphical illustration of an anchor merge and a cross-merge following a snapshot.

FIG. 16 shows how a new anchor is created as a result of a snapshot. The new anchor inherits the same indices as the prior version of the anchor. However, all new writes will be merged into the new anchor. FIG. 17 shows an anchor merge being performed on the prior anchor to make retrieval of the snapshotted data more efficient. This may also make the storage of the index more space-efficient. FIG. 17 also demonstrates how the cross-merge of new write data is performed on the new anchor.

Figure 18:
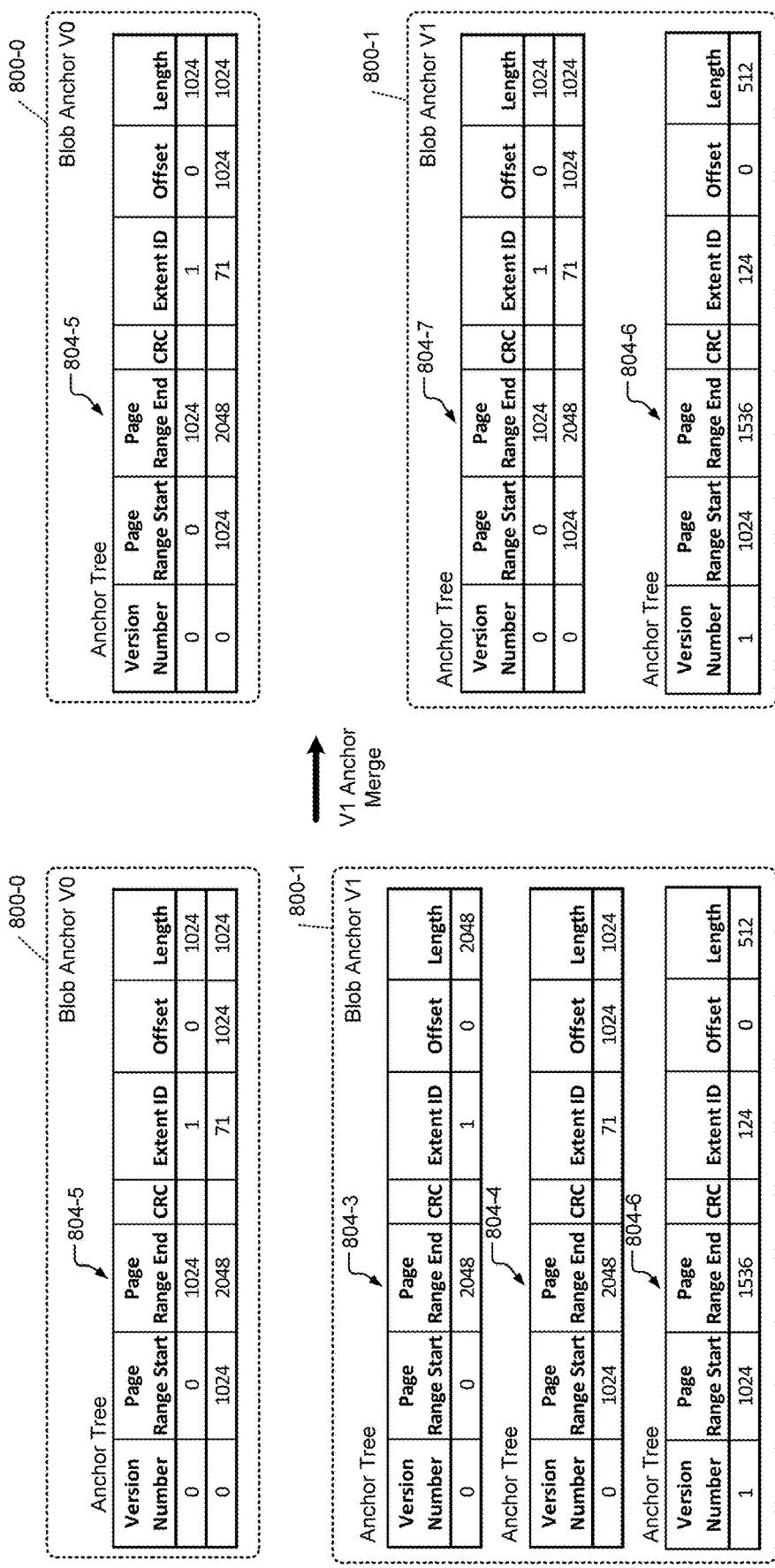
FIG. 18 is a graphical illustration of an example 2-anchor-tree merge following a snapshot.
Figure 19:
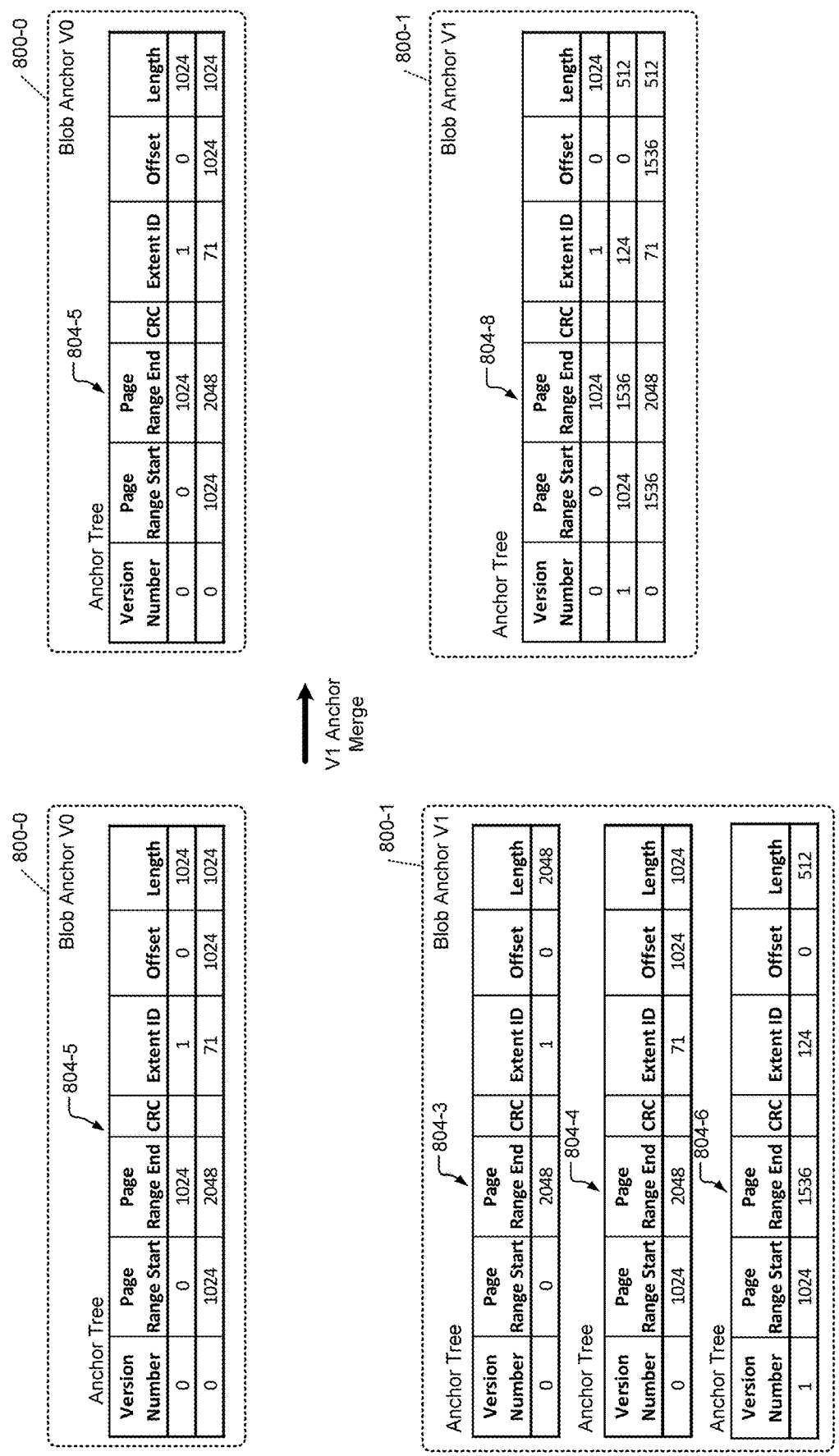
FIG. 19 is a graphical illustration of a 3-anchor-tree merge following a snapshot.
Figure 20:
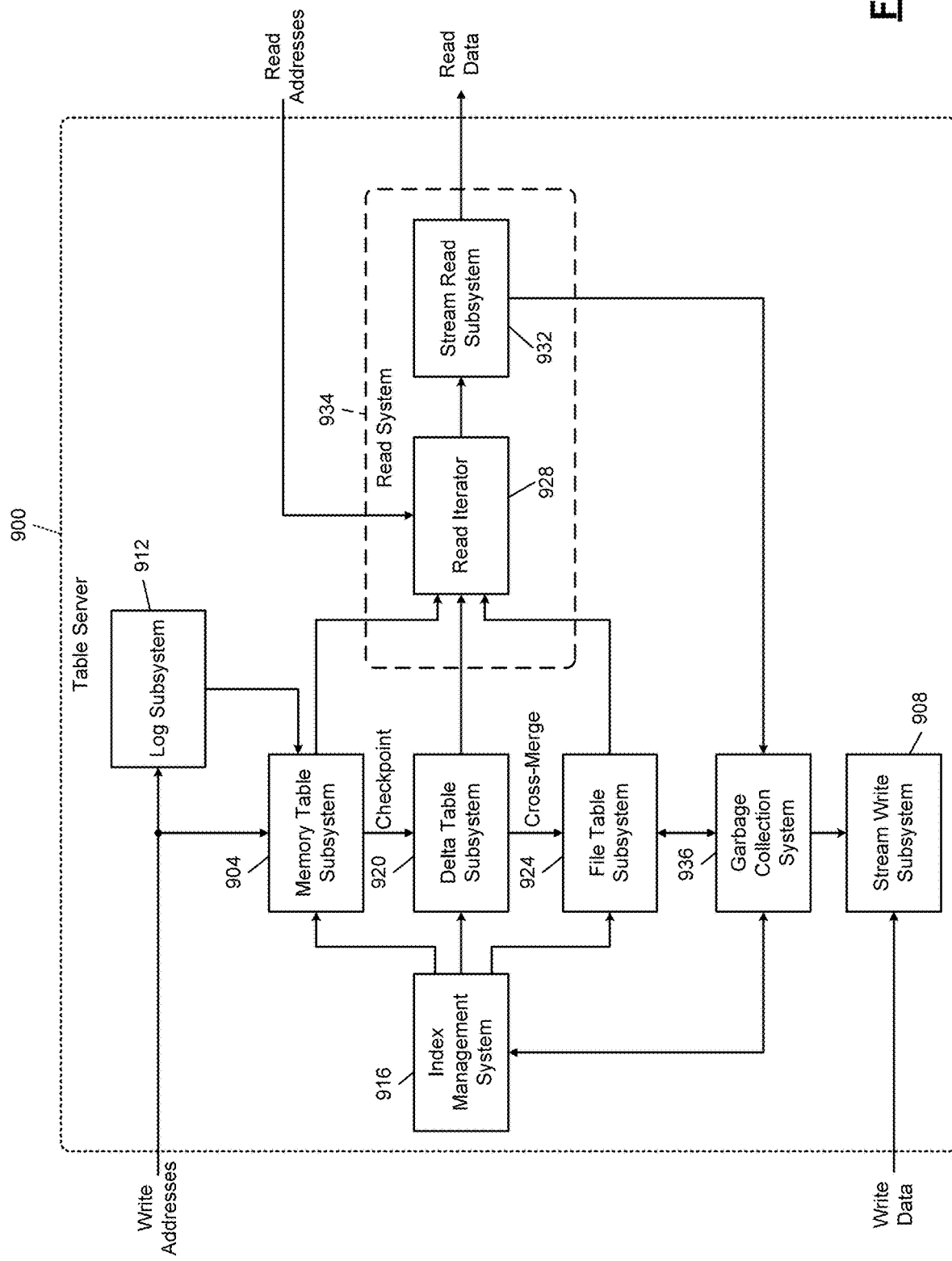
FIG. 20 is a functional block diagram of example elements of a table server.

FIG. 18 illustrates how 2 anchor trees are merged following a snapshot. FIG. 19 demonstrates all 3 anchor trees being merged. In FIG. 18, the last anchor tree is not merged with the first 2 anchor trees, which could be the result of a merge operation still being ongoing in the third anchor tree. FIG. 20 is a functional block diagram of an example table server that may perform or control cross-merge operation shown in FIG. 21, anchor merge operation shown in FIG. 22, and garbage collection shown in FIG. 23.

Overview

In a range-partitioned system, each partition has a unique key range and serves independent data. In other words, each partition is responsible for a contiguous key range that does not overlap with the key ranges of other partitions. Each partition can be served by a different server, so that partitions can be moved among a group of servers—referred to in this disclosure as a "storage stamp"—to balance load. In addition, partitions can be dynamically split and merged to facilitate the load balancing. For example, a partition that has grown to be larger (in terms of storage size or access rate) than average may be split into smaller partitions so that the smaller partitions can be distributed across the storage stamp.

The present disclosure is relevant to storage systems, such as distributed (or, "cloud") storage systems, that offer one or more storage services. For example, binary large objects (blobs) can be stored using a "blob" storage service. In a block blob storage service, separate blocks of data form a single blob. The block blob service may be used to store media files, for example, with each picture or movie being a separate blob.

In a page blob service, the blob is composed of data for a range of addresses. A page blob may be used as a virtual disk by a computer, such as a virtual machine operating in the cloud. The range of addresses stored in the page blob may correspond to hard drive addresses presented to the virtual machine, such as a range of logical block addresses (LBAs).

A file storage service may store individual files. The file storage service may provide access to these files using a standardized protocol, such as the server message block (SMB) protocol and, more particularly, the common internet file system (CIFS) protocol.

Another storage service includes a table storage service, which is a key-value attribute store. The table storage service is schema-less and can be used as a NoSQL data store. A further storage service is a queue storage service in which numbered messages are stored. The queue service may be thought of as a subset of the table service in which the key is simply message number.

In various implementations, every storage service offered by the distributed storage system has a backing index that tracks the user objects and pointers associated with those objects. The index is persisted (persistently stored) in a data structure referred to as a file table. For table and queue storage services, the user data may be stored within the file tables themselves. For block blob storage services, the file tables may contain pointers to the blob data. The file table may be implemented as a persistent log-structured merge-tree (LSM tree) structure. In various implementations, file tables are immutable so writing to one means generating a new one, largely re-using the previous pages on disk in the file table.

In various implementations, each storage stamp is made up of a collection of XTables. Each XTable logically encompasses a set of partitions. These partitions are range-partitioned, where each partition serves a distinct key range (from KEY_MIN to KEY_MAX) and all of the partitions in the set cover the full KEY_MIN to KEY_MAX key range. Page blobs may be stored in the XBlobObjects XTable, and sets of files may be stored in the XFiles XTable.

Each partition is associated with a set of storage streams in which index and user data is stored. A stream is an append-only data structure that stores data into storage servers, described below. For example, each partition is assigned a unique name and streams associated with that partition are named with the partition service name. For example, partition1.blobdata includes data for a block blob server, partition1.pagedata contains data for the page blob service, partition1.ftchk and partition1.data contain the file table data, etc. Each stream is stored as a set of extents that is served by a set of extent node servers. In some implementations, each extent is a fixed length, such as between 0.25 GB and 3 GB. The unit of writing in a stream is an extent and therefore the unit of garbage collection is an extent. Because the stream is append-only, to update an extent, a new extent is written and the old extent becomes obsolete.

The page blob service and file storage service may use a construct called an anchor to store information about the page ranges of each page blog and each set of files. An anchor may be implemented as an LSM tree that is version-aware and range-aware. Page range rows are stored in the anchor to represent page ranges. The page range rows may contain a version number, page range start, page range end, error detection (such as CRC, or cyclic redundancy check), and a data pointer to the data (or a special constant for "no data"). The [page range start, page range end) represents the range, where the page range start is inclusive and the page range end is exclusive.

In a typical key comparison of any row, columns are compared column-by-column, but with range-aware keys like page ranges, the page range start and page range end have to be considered together when comparing two page range rows. If there is overlap in two page range rows, range chopping is performed to generate subsets of ranges based on which row is newer and which is older. For versioning, version numbers monotonically increase with each snapshot. The anchor data structure as well as overall iteration logic can support looking at a restricted set of the data with filtering. The version is also part of the key and helps indicate which page range is newer or older across versions of a page blob or set of files.

Each partition processes read, write, and delete requests. Every delete creates data that is no longer valid, which may be referred to as "garbage." Writes also can create garbage if they overwrite any previously valid data. Additionally, index management operations also create garbage. For example, file table pages that are no longer valid are considered garbage. Further, index management operations, such as merging anchor trees, also create garbage.

Each partition may regularly scan the index and write out occupancy information for later garbage collection. This occupancy information contains a list of extents—for example, for block blobs the extents will be the ones in the .blobdata stream—and for each extent contains the valid occupied byte count. For example, where E0, E1, etc. are extent IDs: {E0: 1 GB, E1: 0.2 GB, E2: 0 GB, E3: 3 GB, . . . }. This information is written to a <partition name>.occupancy stream when the index scan is completed. The same process which scans the index to write these occupancies out is the same process which does garbage collection—they are batched together for performance.

Garbage collection scans the index and, for each object, inspects every data pointer. If the data pointer points to an extent marked for garbage collection, the garbage collection process will rewrite that extent and update the corresponding data pointer. At the end of the garbage collection process, garbage collection tells the stream with a management API (application programming interface) to remove the extents that were rewritten from the corresponding stream. In the background, the stream removes the extents from the corresponding extent node servers, which completes the garbage collection as the disk space is then free to be reused.

When user writes occur to a page blob, such as a put page or clear page, the writes are written to the log and persisted in memory to a memory table. If a partition moves due to load balancing, it will replay the log to insert the update back into the memory table. A process named checkpoint regularly runs based on size, time, log size, memory table size, etc. thresholds. Checkpoint takes the most recent data for any given row in the memory tables and writes that to a file table structure on disk.

For page ranges, the structures created by checkpoint are called delta page file tables, which are temporary objects. If a user query for a page range, such as a get blob or get page ranges operation, is received, the full index is queried. The full index includes the memory table, delta page file tables, and the anchor for that blob, with that being the most recent index order as well.

The present disclosure describes how multiple anchor trees can be used for a single page blob or set of files, when and how additional anchor trees are added, and when anchor trees are combined. This concept is referred to as a staging anchor. Without the staging anchor concept, an anchor lock is used to synchronize different operations. The anchor lock is a simple lock that contains a standard section as well as some metadata about the type of operation and when it was acquired. There are three kinds of operations: cross-merge, garbage collection, and bullet cross-merge (triggered by a copy blob request). The Anchor lock has the following logic:

Bullet cross-merge blocks cross-merge and garbage collection
Cross-merge and garbage collection block each other
Bullet cross-merge has to wait for an ongoing cross-merge
Bullet cross-merge can steal the lock from garbage collection Since anchors are versioned and the versioning aspect of any blob is protected by the anchor lock, the granularity of an anchor lock is not per version of a blob but per overall blob or blob family. In other words, for a blob with 10 versions, there is still just one anchor lock. More details about these operations below.

Cross-merge is the process that regularly looks for delta page file tables, iterates over all of the rows in them, and for all of the rows for the same page blob or set of files, merges those into the appropriate anchor for that blob or set of files. Cross-merge does this version by version. For example, a given page blob can have updates in the delta page file tables for three different versions, V0, V1, and V2. Cross-merge will first see the first V0 row, then find the appropriate anchor to merge into, and iterate and merge all V0 rows from the delta page file tables into the anchor by writing a new anchor tree and committing that anchor tree.

Then cross-merge will see the first V1 row, inherit the anchor tree generated from writing the V0 anchor, and repeat the process for all V1 rows to generate a new anchor tree and commit the new anchor tree. The process is similar for V2. This results in three different anchors, where V1 builds on V0 and V2 builds on V1. These three anchors are hierarchical and share data. Before staging anchor, there is only one anchor tree, which will grow bigger over time, eventually reaching some stable point based on the total number of page ranges. In some situations, a single anchor tree can grow to several tens of GBs in size. With only a single anchor tree, cross-merge must pay the cost of rewriting full pages even if there is very little change—that is, huge write amplification. For example, merging a 64 MB delta page file table into a 64 GB anchor can lead to 1024× write amplification.

With staging anchor, cross-merge may avoid merging into the base, or root, anchor tree. If there is only one anchor tree, cross-merge will generate a second anchor tree. If there are two or more anchor trees, cross-merge will look at the last anchor tree and undergo selection logic based on the last anchor tree's size to determine whether a new anchor tree should be generated. If there are any pending operations on the last anchor tree, cross-merge will generate a new anchor tree regardless. Cross-merge then adds a merge operation to the pending operation list on the last anchor tree (which may have just been created).

If there are too many anchor trees, cross-merge will also trigger anchor merge concurrently. This approach essentially removes the need for synchronization so that in various implementations the anchor lock is omitted with cross-merge. The remaining synchronization may be in-memory metadata about which operations are pending on the anchor trees. Managing this metadata may be done with simple locking—with very little operations under the lock—so that there are no blocking or concurrency issues on the anchor operations.

Bullet cross-merge is essentially a special cross-merge that is special in two ways. First, in the anchor lock synchronization described above, bullet cross-merge is allowed to steal the lock from garbage collection (where a regular cross-merge cannot). Second, it is special because it is happening in response to a copy blob operation. Both the source and the destination of a copy blob operation may trigger a bullet cross-merge. Because the bullet cross-merge is invoked for a copy blob operation, it is specific to only that blob. In other words, the bullet cross-merge is a cross-merge for a single blob in the delta page file tables as compared to the regular cross-merge, which works on range rows for all blobs in the delta page file tables.

When bullet cross-merge runs for a blob, special metadata is maintained in memory and in persistent storage (such as on solid-state or spinning disk) indicating that a merge was already performed for a certain blob for certain delta page file tables. The cons of being limited to a single anchor tree, and the corresponding benefits of the staging anchor process, are similar between the cross-merge and the bullet cross-merge. With staging anchor, bullet cross-merge no longer needs to steal the lock from garbage collection because a new anchor tree can be generated instead.

Because bullet cross-merge is invoked on behalf of copy blob, a user operation, the threshold above which a new anchor tree will be generated is decreased. In other words, the bullet cross-merge is more likely to generate a new anchor tree, which reduces latency since merging with an existing tree is slower than writing a new tree.

Anchor merge is an operation introduced to handle merging different anchor trees into a single anchor tree. Anchor merge is primarily triggered by cross-merge and garbage collection, but a regular check can be performed to see if blobs in the partition should trigger anchor merge. Additionally, user operations may occasionally check to see whether anchor merge should be performed. Anchor merge works by first summing up the size and count of the anchor trees, from the most recent anchor tree to the oldest anchor tree, until a certain threshold of either size or count is reached. This analysis stops prior to reaching an anchor tree already occupied by another anchor tree operation, such as garbage collection or cross-merge. The anchor merge analysis also evaluates whether write amplification from a prospective would exceed a threshold, and may prevent the anchor merge if so.

If the anchor merge analysis finds a valid set of tables to merge, it reserves those anchor trees to anchor merge by marking them in memory and begins the anchor merge itself. Anchor merge merges different anchor trees into one anchor tree, generating a new anchor tree. When the merge is complete, the anchor trees that were merged are replaced in memory with the single new anchor tree. This lowers the anchor tree count for that blob version and compacts that blob version's page range index.

Without staging anchor, garbage collection of page ranges works by, for each version of each blob in the partition, iterating through the anchor and, for every page range, evaluating whether the corresponding data pointer is contained in a list of extents marked for garbage collection. If so, the data for that page range is rewritten and the updated page range is maintained in an in-memory list.

After iterating through all page ranges for a given version of a blob, the anchor can be updated by forming an imitation delta page file table from the list of updated page ranges and triggering a cross-merge on the imitation delta page file table. This updates the anchor tree to contain the new page ranges with updated data pointers. All of the garbage collection work for all versions of a given blob is done while holding the anchor lock. If at any time, garbage collection loses the anchor lock to bullet cross-merge, garbage collection will quit and retry. After a certain number of failed retries, garbage collection will move onto the next blob, and any extents that could not be garbage collected due to such a case are excluded from being garbage collected until the next round of garbage collection.

With staging anchor, garbage collection may be restricted to just the first/root/base anchor. Because cross-merge and bullet cross-merge always work on the second or greater anchor, garbage collection would then never be blocked by cross-merge or bullet cross-merge. Additionally, in order to have more data eligible for garbage collection, garbage collection may check if an anchor merge should be triggered on each version of a blob before doing garbage collection work. The thresholds anchor merge uses when invoked by garbage collection may be different than when anchor merge is invoked otherwise.

In implementations where garbage collection would invoke anchor merge as a first step, there is no problem with garbage collection having to wait for an existing anchor merge to complete. In other words, garbage collection is effectively not blocked by any other anchor operation. An additional change to garbage collection for staging anchor is that, for a specific blob version, garbage collection will iterate over the anchor trees that are not the root anchor tree and exclude those anchor trees' extents from garbage collection. In this way, staging anchor extents are only garbage-collected when they are merged into the root anchor. Since garbage collection has a natural relationship to the age of the data, this may generally be advantageous. Anchor merge may also have a time-based trigger so that staging anchor data will not live for too long to the point where garbage collection is held up from garbage collecting certain data.

An ordered list of pointers to anchor trees may be maintained in a structure called an anchor. File table pages store multiple rows for a partition of an XTable. For a page blob XTable, each row may correspond to a version of a specific page blob and include a pointer to the anchor for that page blob version or the anchor itself. In various implementations, the row may include the anchor itself until the size of the anchor exceeds a predetermined sizes threshold, at which point the anchor is moved out of the row and replaced by a pointer to the new location of the anchor.

Whenever any page range query/iteration is requested, the anchor pointer from the blob row is read and, from there, the staging anchor trees are also read. An iterator may be constructed for each anchor tree. This may not require any changes to the iterator code used before development of the staging anchor, which worked on the single anchor tree.

In the XTable for page blobs and sets of files, there may be one or more columns for metadata. These columns may be used to indicate whether staging anchor is enabled for the row (for example, for a specific version of a blob). In various implementations, all versions of a blob may need to have the same setting for whether staging anchor is enabled. In various implementations, one of the metadata columns may be a set of binary flags; one of the binary flags may indicate (such as with a binary one) that staging anchor is enabled for the row. Allowing staging anchor to be enabled per-row may enhance upgradeability and may have performance benefits.

Because staging anchor may have fundamental logical differences regarding, for example, how locking works for a partition, a partition may need to be updated to support staging anchor. In addition to schema changes to support the multiple anchor trees, the partition code is upgraded. Each partition can be upgraded individually—in other words, a single table server may manage multiple partitions, some for which staging anchor is enabled and some for which staging anchor is not enabled.

A copy blob operation may cross partitions, complicating an incremental upgrade. Copying from a partition with staging anchor disabled to a partition with staging anchor enabled is fine. Similarly, if both partitions are in the same state, it is fine. But in the case of copying from a partition with staging anchor enabled to a partition with staging anchor disabled, an incompatibility may exist. To address this issue, the copy may be failed or suspended and an urgent partition reload is triggered on the destination partition. The copy operation will then resume once the reload completes. Since a partition reload may be very fast, such as on the order of seconds, the copy operation may experience only a minor increase in latency.

Client and Server

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

Figure 1:
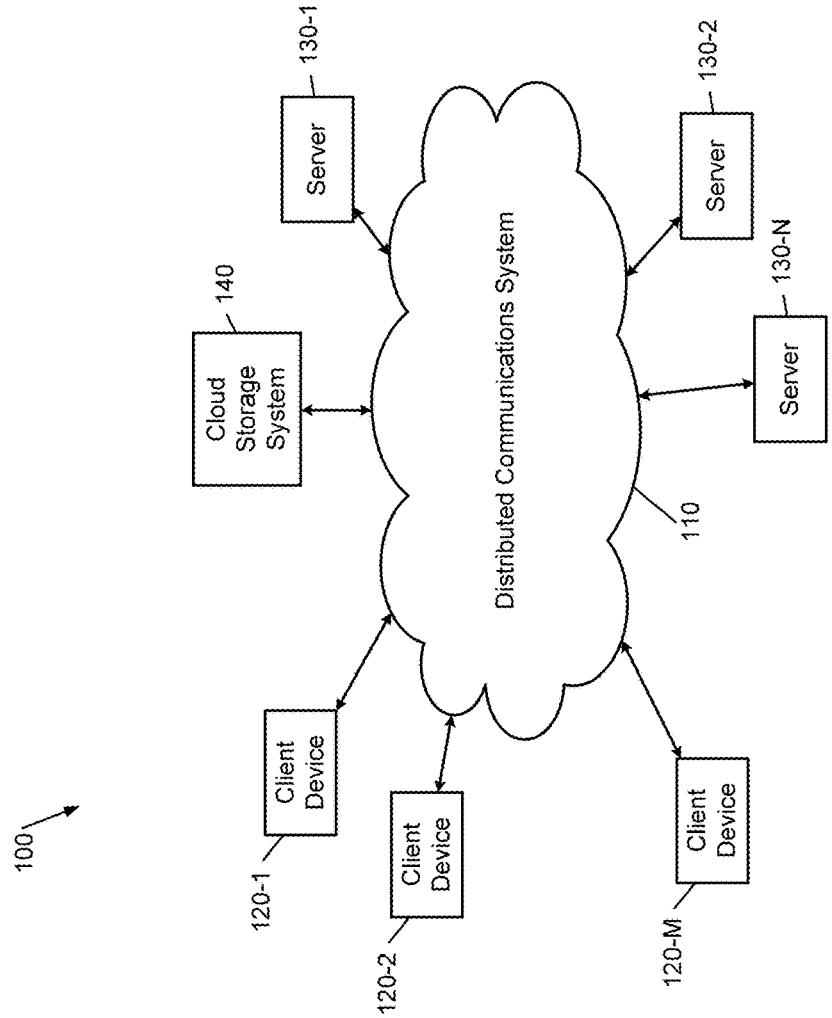
FIG. 1 is a simplified block diagram of an example distributed computing system including a cloud storage system.

FIG. 1 shows a simplified example of a distributed computing system 100. The distributed computing system 100 includes a distributed communications system 110, one or more client devices 120-1, 120-2, . . . , and 120-M (collectively, client devices 120), and one or more servers 130-1, 130-2, . . . , and 130-M (collectively, servers 130). M and N are integers greater than or equal to one. The distributed communications system 110 may include a local area network (LAN), a wide area network (WAN) such as the Internet, or other type of network. The client devices 120 and the servers 130 may be located at different geographical locations and communicate with each other via the distributed communications system 110. The client devices 120 and the servers 130 connect to the distributed communications system 110 using wireless and/or wired connections.

The client devices 120 may include smartphones, personal digital assistants (PDAs), tablets, laptop computers, personal computers (PCs), etc. The servers 130 may provide multiple services to the client devices 120. For example, the servers 130 may execute software applications developed by one or more vendors. The server 130 may host multiple databases that are relied on by the software applications in providing services to users of the client devices 120.

A cloud storage system 140 stores data on behalf of one or more of the servers 130 and/or on behalf of one or more of the client devices 120. This data may be used as a shared storage repository by, for example, the servers 130. Further, the data may be used to communicate among, for example, the servers 130. Further, the cloud storage system 140 may be implemented by one or more servers configured similarly to the servers 130.

FIG. 2 shows a simplified example of the client device 120-1. The client device 120-1 may typically include a central processing unit (CPU) or processor 150, one or more input devices 152 (e.g., a keypad, touchpad, mouse, touchscreen, etc.), a display subsystem 154 including a display 156, a network interface 158, memory 160, and bulk storage 162.

The network interface 158 connects the client device 120-1 to the distributed computing system 100 via the distributed communications system 110. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices.

The processor 150 of the client device 120-1 executes an operating system (OS) 164 and one or more client applications 166. The client applications 166 include an application that accesses the servers 130 via the distributed communications system 110.

Figure 3:
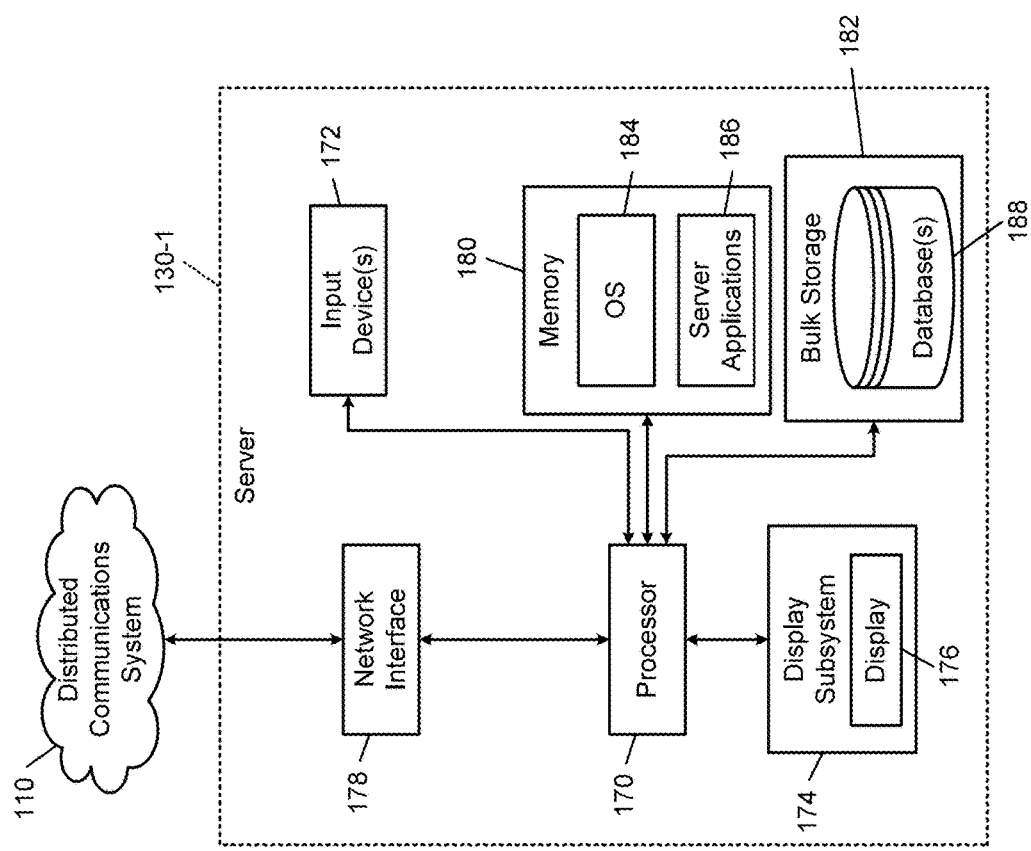
FIG. 3 is a functional block diagram of an example implementation of a server that performs one or more functions of the cloud storage system.

FIG. 3 shows a simplified example of the server 130-1. The server 130-1 typically includes one or more CPUs or processors 170, a network interface 178, memory 180, and bulk storage 182. In some implementations, the server 130-1 may be a general-purpose server and include one or more input devices 172 (e.g., a keypad, touchpad, mouse, and so on) and a display subsystem 174 including a display 176.

The network interface 178 connects the server 130-1 to the distributed communications system 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the server 130-1 executes an operating system (OS) 184 and one or more server applications 186, which may be housed in a virtual machine hypervisor or containerized. The server applications 186 may access data, such as block blob or page blob data, from the cloud storage system 140. In some implementations, cloud storage system 140 may include one or more servers configured as shown in FIG. 3, in which the server applications 186 may include operations, such as index management, performed by the cloud storage system 140. The bulk storage 182 may maintain one or more databases 188 that store data, such as index data and user data, used by the server applications 186 to perform respective functions.

Distributed Storage System

Figure 4:
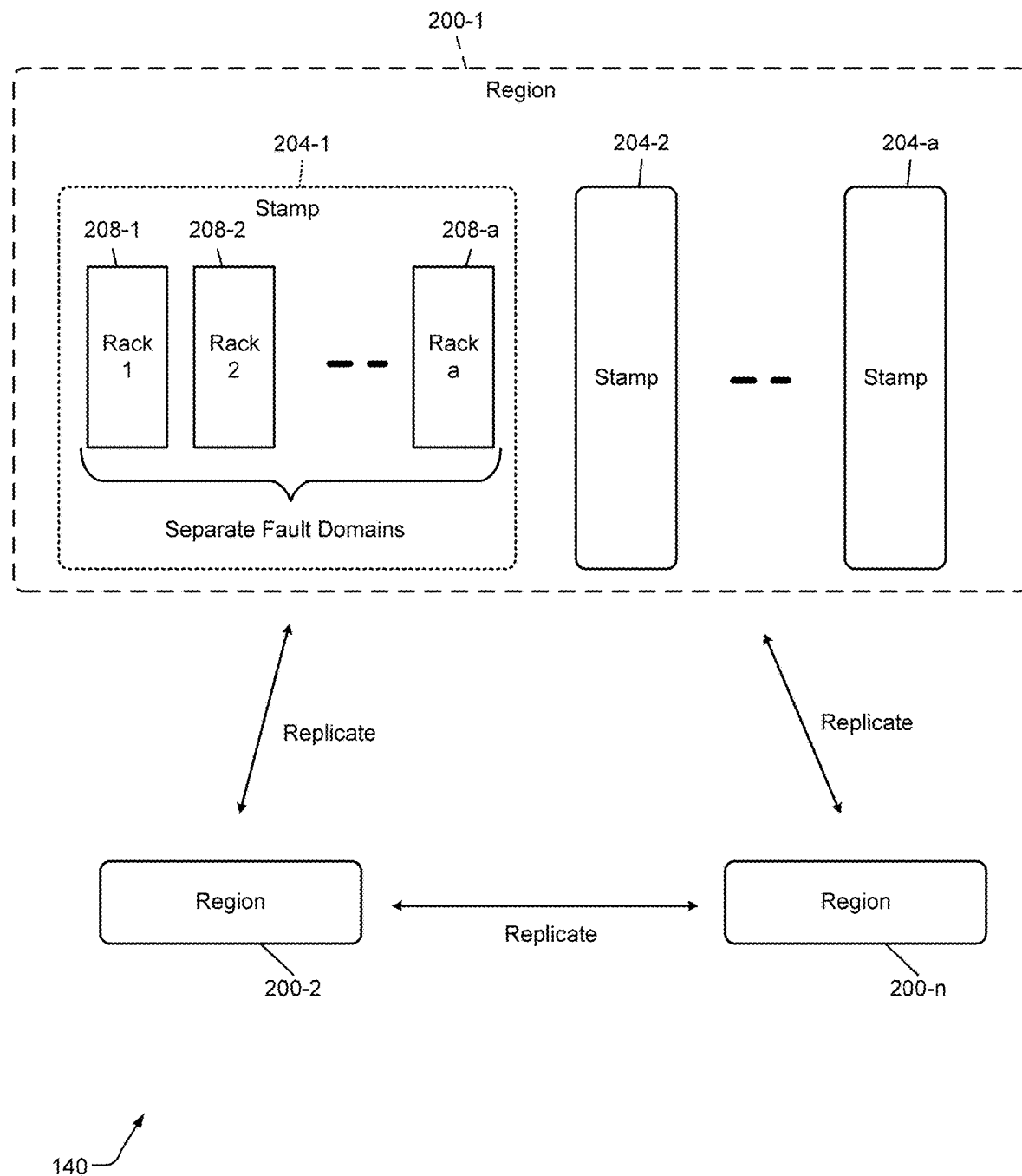
FIG. 4 is a high-level block diagram of an example distributed cloud storage system.

In FIG. 4, the cloud storage system 140 (also referred to as a distributed storage system) may include multiple regions 200-1, 200-2, . . . and 200-*n* (collectively, regions 200). The regions 200 may be located in separate geographical locations (such as in different areas of a country or in different countries) to provide greater reliability in the face of regional failures.

In each of the regions 200, collections of servers referred to as storage stamps (or, stamps) provide the processing and storage capabilities for the cloud storage system 140. For example, in the region 200-1, storage stamp 204-1, 204-2, . . . and storage stamp 204-*p* (storage stamps 204) are included. Each of the storage stamps 204 may include one or more racks of servers. For example, in FIG. 4, the storage stamp 204-1 is shown with racks 208-1, 208-2, . . . and 208-*q*. Data may be replicated, or mirrored, within one of the storage stamps 204, between the storage stamps 204, and across the regions 200. For example, based on a customer's agreement with the cloud storage system 140, the extent and geographical reach of replication may be contractually determined.

Figure 5:
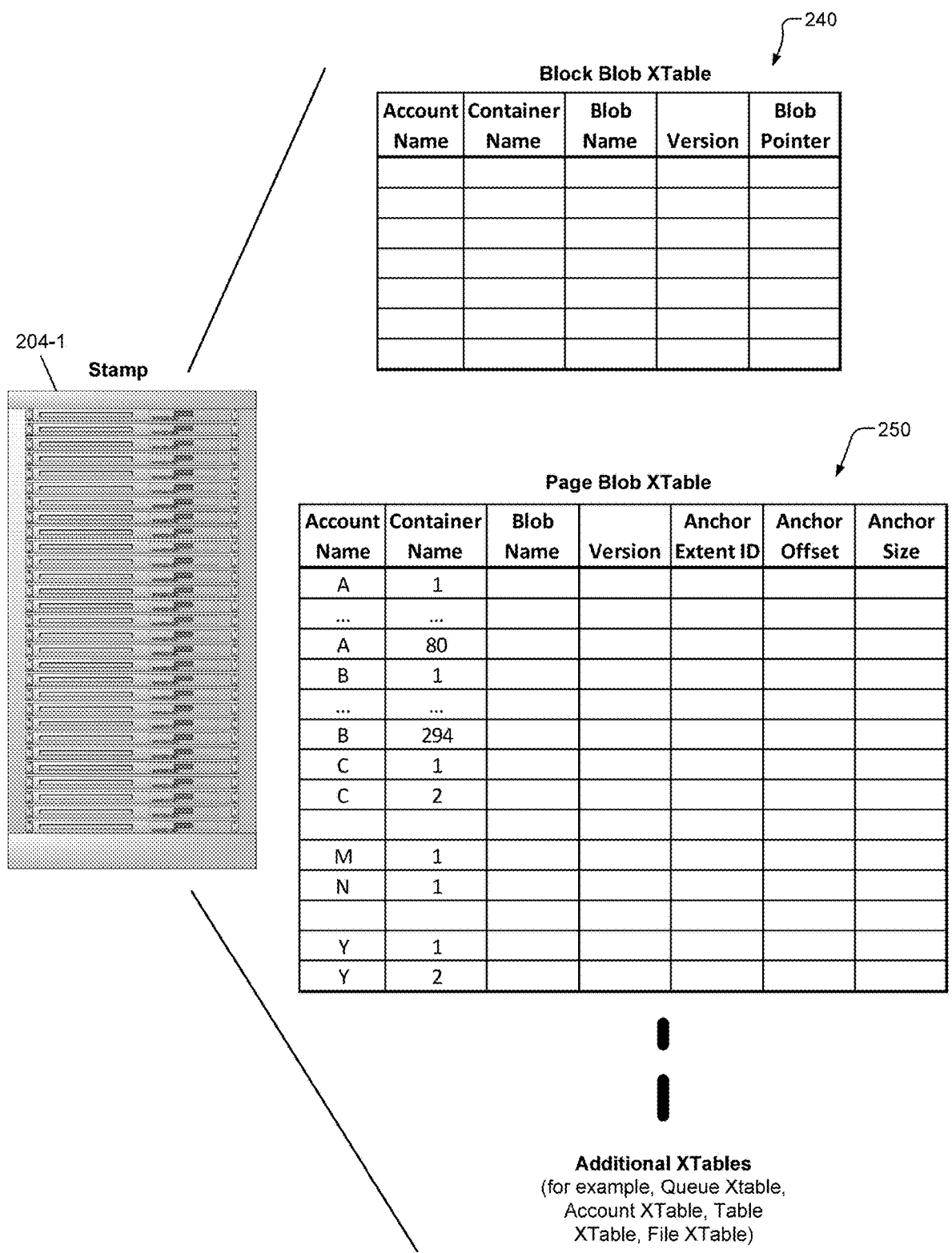
FIG. 5 is a graphical illustration of example logical index tables stored by a cloud storage system.

In FIG. 5, the storage stamp 204-1 is graphically illustrated by a single rack including many servers. The storage stamp 204-1 may store data for some or all of the services offered by the cloud storage system 140. In other words, table, queue, and blob services may all be offered by each individual storage stamp, including the storage stamp 204-1.

Each different storage service may be indexed by a separate table. The top-level index table for each service is named "XTable" to distinguish from other tables within the architecture. For example, a block blob storage service is indexed by a block blob XTable 240, while a page blob storage service is indexed by a page blob XTable 250.

Additional XTables are stored by the storage stamp 204-1 if those services are offered by the cloud storage system 140. For example, additional XTables may include a table XTable and a file XTable. Further, XTables that may not be visible to users may be stored, such as an account XTable and a billing XTable. The account XTable may keep track of the accounts established by customers within the storage stamp 204-1 and may include access and authorization data. The billing XTable may include billing information that tracks per-account usage for billing purposes.

Page Blob Xtable

Figure 6:
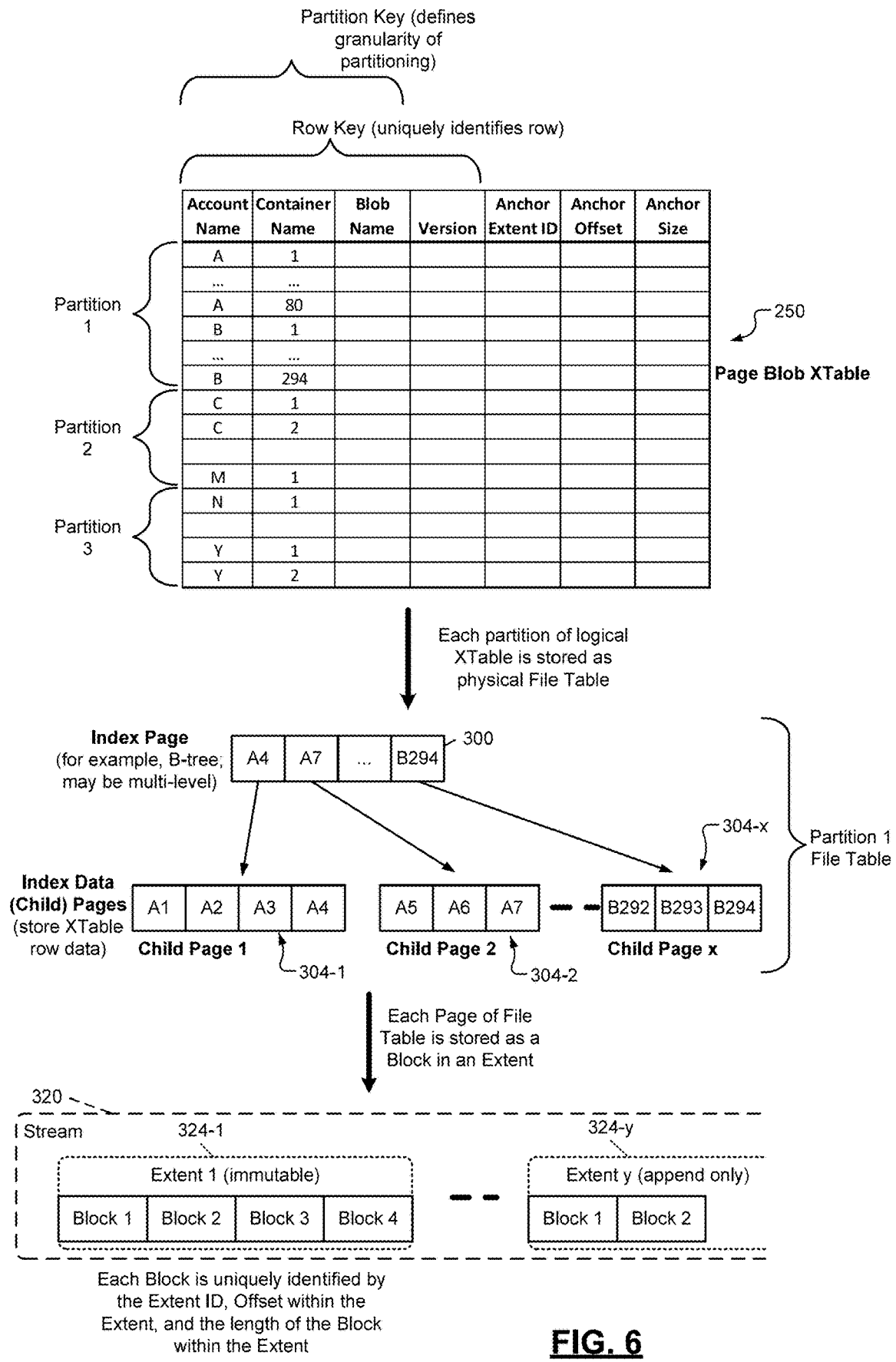
FIG. 6 is a graphical illustration of the relationship between logical and physical indexing and storage of an index table for page blobs.

In FIG. 6, example columns of the page blob XTable 250 are shown. Each customer may have one or more accounts. Within each account, there may be one or more groups, referred to as containers. Each container holds one or more blobs. The blobs may be versioned, with a snapshot causing the creation of a new version and the marking of the prior version as read only. For each blob version, there is a pointer to the anchor that maintains the index for that blob version.

The anchor may include an ordered list of pointers to anchor trees. The ordered list will have at least one anchor tree (the first, or root, tree) and may have more as a result of cross-merges. In other implementations, the ordered list of anchor tree pointers may be stored in one or more columns of the page blob XTable 250 itself.

Example indications show which columns form the row key for the page blob XTable 250 and which columns form the partition key of the page blob XTable 250. The row key uniquely identifies the row within the page blob XTable 250. In other words, there are no two rows in the page blob XTable 250 that have the same values for all four columns that are part of the row key. The partition key establishes the granularity of partitioning. In other words, only columns that are part of the partition key are used to determine how to split (or, partition) the XTable into separate partitions.

The columns shown for the page blob XTable 250 are examples only and may be a subset of the full set of columns in an actual implementation. Further, the columns may be named differently and stored in any order. The columns of the page blob XTable 250, as well as the definition of which columns form the row key and which columns form the partition key, are referred to as the schema of the page blob XTable 250.

In this example, the first column shown is account name. Each customer may have multiple storage accounts. The customer may use different storage accounts for different purposes or for different groups of their own customers. In some implementations, a customer may need to create additional storage accounts if a limit imposed by the cloud storage system is reached. For example, the cloud storage system may impose a specific limit, such as 500 TB, on the amount of storage associated with a storage account. Because a storage account is not split across stamps, limiting the size of storage accounts prevents a single storage account from becoming too large a proportion of a stamp and making load balancing across stamps more difficult.

In some implementations, the account name includes a unique identifier of the customer as well as a name provided by the customer for the account. In other implementations, the account names are specified entirely by the customers but must be globally unique. Within a storage account, there can be multiple blob containers, which are identified by the container name column. Within each container, there can be multiple blobs, each identified with a different name, corresponding to the blob name column.

The present contents of a blob may be preserved for the future by requesting a snapshot. Each snapshot corresponds to a different version and therefore the version column identifies which snapshot of the blob is referred to in that row of the page blob XTable 250. An anchor pointer column (or columns) points to the location of that blob version's anchor data structure within the storage stamp 204-1. The anchor data structure may, in turn, be a list of pointers to anchor trees. The anchor trees identify where the actual user data is stored. For example, the anchor pointer may span three columns: extend ID, offset within the extent, and size of the anchor data structure. In other implementations, the anchor pointer column(s) may actually include the list of anchor trees instead of just a pointer to the list of anchor trees.

The page blob XTable 250 may also include one or more metadata columns (though only one is shown) with additional information for the row. Although the page blob XTable 250 is shown in FIG. 6 in its logical form as a simple two-dimensional table, the page blob XTable 250 is actually physically stored in separate partitions. And as described in more detail below, those separate partitions are not simply smaller 2-dimensional tables.

In FIG. 6, the partition key is shown to encompass the account name, the container name, and the blob name. The page blob XTable 250 is split, or partitioned, such that all of the rows sharing a same partition key are stored in the same partition. For manageability and performance reasons, partitions may be defined by contiguous ranges of the partition key.

For a simplistic illustration of partitioning, example values are shown for account name and container name. In reality, the account name would generally be much more complex and is certainly not constrained to a single capital letter. Similarly, the container name is not restricted to an integer and is not necessarily sequential. In the page blob XTable 250, there are multiple account names. These account names may be accounts for separate users. In other words, data from different users is stored together within the page blob XTable 250. This allows load balancing across users so that if one user is heavily using data, that user can be combined in a partition with less heavy users.

In this simplistic example, Partition 1 includes rows from the page blob XTable 250 whose account name and container name vary from A1 up to B294 (in this simple example, blob name and version are ignored). Partition 2 includes C1 through M1. Partition 3 includes N1 through Y2. In reality, the partitions may be defined with one end of the range being open (exclusive) with the other end of the range being closed (inclusive).

As suggested above, the page blob XTable 250 is not simply stored as three separate two-dimensional tables, one for each partition. Instead, the rows of each partition are stored as a tree data structure. For example, a multi-level B-tree or B+ tree may be used to store each partition. For Partition 1, a root index page 300 points to subtrees that divide up the partition. For example, the root index page 300 includes entries indicating upper ends of ranges of the row key. In this example, the first entry of the index page 300 points to a subtree including all rows up to A4, the next entry in the index page 300 points to a subtree encompassing rows greater than A4 up to A7, while the final entry in the index page 300 includes rows up through B294.

FIG. 6 shows a single index level, where the pages below the index page 300 are child (or, data) pages that include the actual data of the page blob XTable 250. In various implementations, some or all file tables may have additional levels of indexing such that the partition is subdivided into more and more subtrees before reaching the index data pages.

In FIG. 6, index data page 1 304-1, index data page 2 304-2 and index data page x 304-x (index data pages 304) are shown. As indicated by index page 300, the index data page 304-1 includes entries up through rows A4, including row A1, row A2, row A3, and row A4. Note that for simplicity of this illustration, the row is being identified simply by the first two columns. In reality, the row would need to be specified by all of the columns forming the row key. In other words, there will likely be many rows whose account name is "A" and whose container name is "1".

Each of the pages of the Partition 1 file table (that is, the index page 300 and the index data pages 304) is stored as a block in an extent. Further, the anchor trees referenced by the anchor pointer column(s) of the page blob XTable 250 point to one or more blocks in one or more extents that store the actual page blob data.

For purposes of illustration, a single stream 320 is shown, which includes Extent 1 324-1 through Extent y 324-y. The final extent in the stream 320, which in this case is Extent y 324-y, is append only. In other words, blocks can be added to Extent y 324-y, but existing blocks cannot be modified or deleted. All previous extents within the stream 320, which includes Extent 1 324-1, are immutable (unchangeable).

Therefore, in order to modify any of the data in Block 1, Block 2, Block 3, or Block 4 of Extent 1 324-1, a new extent, such as Extent y 324-y, must be used to store the data, making the old data within Extent 1 324-1 no longer valid. Data that is no longer valid may be referred to as garbage. Extents are uniquely identified with an ID, and each block within the extent may be uniquely specified by the extent ID, the offset of the block within the extent, and the length of the block. As described in more detail below, the file table pages may be stored in one stream, while page blob data is stored in another stream.

Storage Stamp

Figure 7:
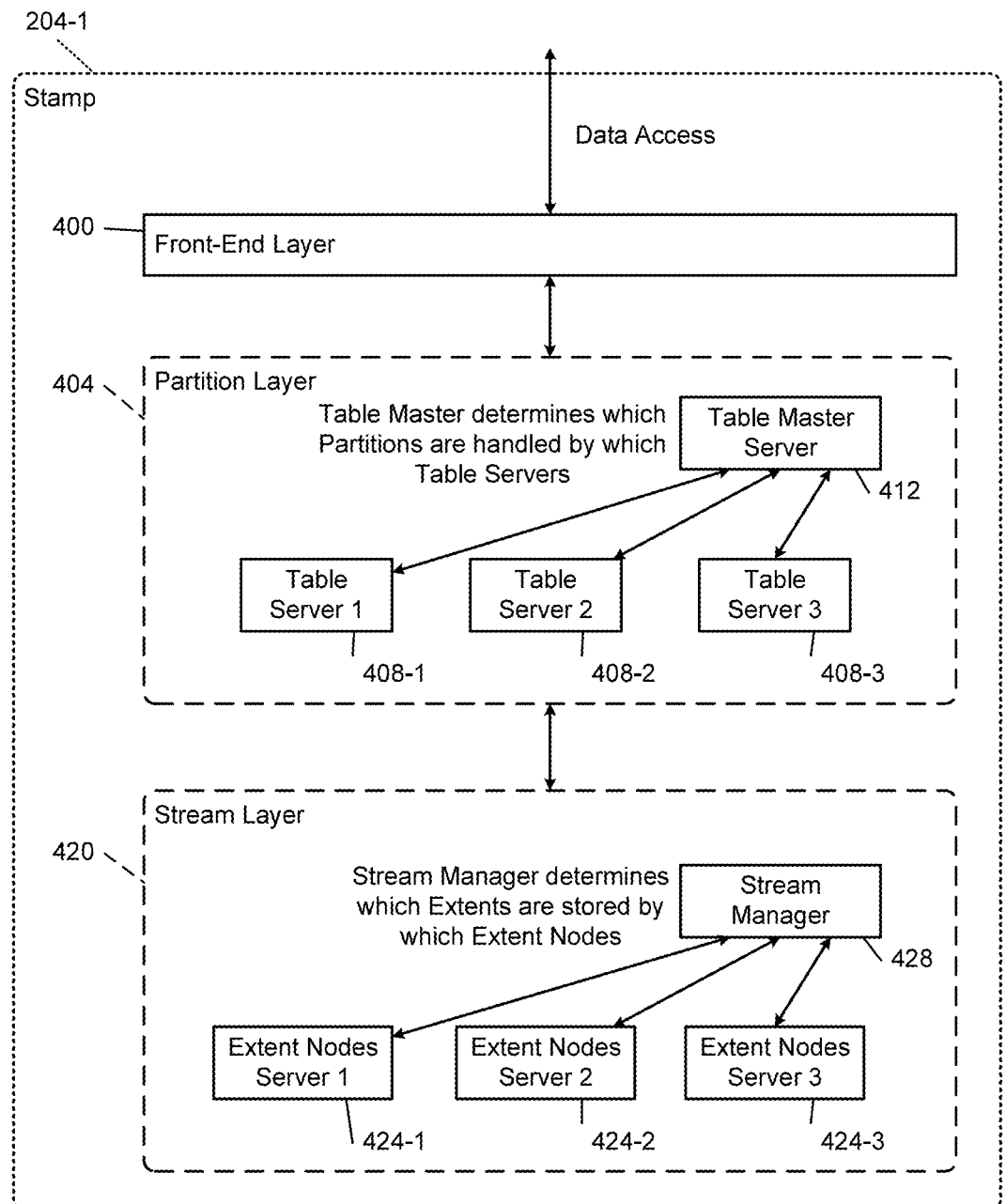
FIG. 7 is a high-level functional block diagram of a storage stamp within the cloud storage system.

In FIG. 7, the storage stamp 204-1 is shown with functional blocks. A front-end layer 400 receives data access requests, including read requests, write requests, and delete requests. These data access requests are processed and provided to a partition layer 404, which includes table servers 408-1, 408-2, and 408-3 (collectively, table servers 408). Each one of the table servers 408 handles one or more partitions, and the assignment of partitions to the table servers 408 is coordinated by a table master server 412. The front-end layer 400 therefore provides the processed data access requests to the table servers 408 depending on which partition the data access request pertains to.

The table servers 408 maintain indices for partitions, such as one or more partitions of the block XTable 240 and one or more partitions of the queue XTable 250. The table servers 408 may perform index management, garbage collection, reading, and writing.

The underlying data used by the table servers 408, including index data and user data, is stored by a stream layer 420. The stream layer 420 may understand only storing blocks within extents within streams, with no semantic understanding of the contents or interrelationship of the streams. Instead, the stream layer 420 is simply responsible for ensuring accurate and available storage of information.

Data stored into the stream layer 420 may be organized as sets of streams. For example, the file tables of FIG. 6 may be stored in one stream, while the actual blob data may be stored in a different stream. Each stream is an ordered sequence of extents. Each extent is stored by an extent node server, three of which are shown in the stream layer for 420 of FIG. 7: extent node server 1 424-1, extend node server 2 424-2, and extent node server 3 424-3. A stream manager 428 maintains an ordered list of the extents within each stream and determines which of the extent node servers 424 store which extents.

Pointer Hierarchy

Figure 8:
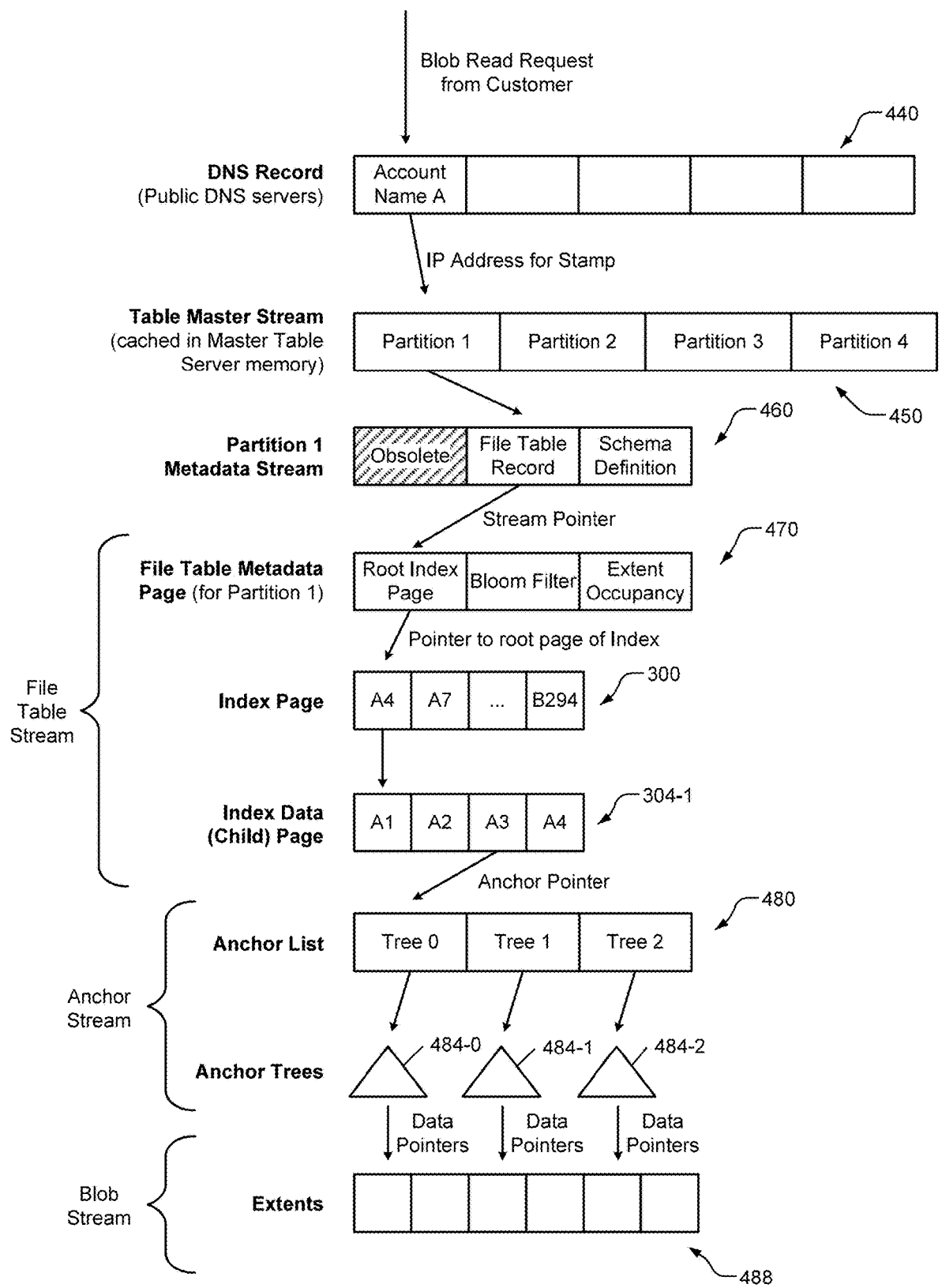
FIG. 8 is a simplified graphical illustration of an indexing hierarchy for a page blob data structure.

FIG. 8 shows further details of an example implementation of the XTable storage architecture shown in FIG. 6. In the example of FIG. 8, a customer forms a blob read request by specifying a domain name. The domain name is based on the account name of the blob of interest. This domain name is registered in the public DNS and therefore resolves to an internet protocol (IP) address of the stamp. For an example, the IP address may be of the front end layer 400 of the storage stamp 204-1.

All of the accounts for a single stamp may resolve to the same IP address or, for load balancing purposes or other reasons, the different accounts may resolve to different IP addresses of the stamp. Because the domain name is account-specific, the account can be shifted to a different stamp and the domain name updated to balance loads between stamps.

In various implementations, the cloud storage system 140 may have a predefined domain name, where the account name is prepended to create a subdomain. As one example only, for the AZURE storage system from Microsoft Corp., the predefined domain name may be blob.core.windows.net. In this example, an account name of "A" corresponds to a subdomain of a.blob.core.windows.net. As a result, a public DNS server resolves a.blob.core.windows.net to a specific IP address for the stamp (a DNS record is referenced at 440).

In this example, the blob read request specifies row A3 (as above, for simplicity, the blob name and version number columns are ignored). The blob read request is transmitted to the IP address specified by the account-name-specific domain name. The blob read request is provided to the table master server 412, which identifies which partition corresponds to the blob read request. For example only, the blob read request may include a uniform resource locator (URL) in which the partition name is encoded.

The table master server may have a mapping 450 cached in memory from partition name to a corresponding metadata stream of the partition on a specific table server. The persistent record of the mapping 450 may be stored in the stream layer 420.

The metadata stream for a partition, such as metadata stream 460 for Partition 1, includes a file table record with a stream pointer to a corresponding file table metadata page 470. Each time the file table metadata page 470 is updated (specifically, a copy of the file table metadata page 470 is written with updated data), a new file table record is created in the metadata stream 460 to point to the new file table metadata page. The prior file table record in the metadata stream 460 is then obsolete (an example of an obsolete file table record is shown in FIG. 8 with cross-hatching). The metadata stream 460 also includes one or more schema definitions, which may define the schema used for index pages, such as the root index page 300, and for index data pages, such as the index data page 304-1.

The file table metadata page 470 includes a pointer to the root index page 300 of the index for Partition 1. In addition to the root index page pointer, the file table metadata page 470 may include a Bloom filter. Data written to the cloud storage system 140 may be placed in a memory table or a row data cache before or in addition to being written into the blob stream. A Bloom filter may be maintained for each checkpoint to indicate if the row being accessed may be located in the checkpoint. This allows skipping checkpoints that definitely do not have that row. The file table metadata page 470 may further store (or point to) a record of extent occupancy for garbage collection purposes.

The root index page 300 was previously described in FIG. 6. Although in this example there is only one level of index, practical implementations may have multiple index levels and the number of levels may vary between partitions. Further, the number of levels may vary over time for a specific partition. If the blob read request specifies a row with a key that is less than or equal to A4, the index page 300 points to the index data page 304-1, which was also shown in FIG. 6. For this example, assume that row A3 was requested by the blob read request.

The index data page 304-1 includes the row data for a series of rows of the page blob XTable 250. In this simple example, a row (which corresponds to a specific version of a specific page blob) identified by A3 points to an anchor list 480. The anchor list 480 includes an ordered list of one or more anchor trees. As cross-merge creates trees, the trees may be added to the anchor list 480. Similarly, when anchor merge combines trees, the anchor list 480 is reduced. In various implementations, the anchor list 480 may be constrained to a certain upper bound of anchor trees. In such a case, the anchor list 480 may include a data structure with empty locations (filled with ignored values) for the maximum number of trees, and as trees are added, that data is replaced with actual pointers to anchor trees.

In FIG. 8, the anchor list 480 is shown with three entries pointing to anchor tree 484-0, anchor tree 484-1, and anchor tree 484-2 (collectively, anchor trees 484). The extents where the user data is stored are represented graphically by a stream 488, and the anchor trees 484 include data pointers to the user data in the stream 488. Additional details will be discussed below beginning with FIG. 10.

Index Hierarchy

In FIG. 9, incoming writes are shown as having user data and index data (the address ranges to which the user data corresponds). The index data is written to a memory table 504, while the user data is written to a blob stream 508. As the memory table 504 accumulates index data, a checkpoint operation may be performed to create delta page file tables. In FIG. 9, delta page file tables 512-0, 512-1 ... 512-$p$ (delta page file tables 512) are shown. A cross-merge adds the delta page file tables 512 to the latest anchor for the corresponding blob.

For a given blob, there may be q+1 versions as a result of taking q snapshots. FIG. 9 shows blob anchor 516-0 for version 0 of the blob anchor, 516-1 for version 1 of the blob anchor, and 516-$q$ for version q of the blob anchor. The blob anchors for version 0 up through version q−1 are all immutable. In other words, any new writes are merged into the version q blob anchor 516-$q$.

Because index data may be stored in the memory table 504, the delta page file tables 512, or the blob anchors 516, a query iterator 540 may need to consult each of the memory table 504, the delta page file tables 512, and the blob anchors 516, in that order, to determine where the latest data is stored. The storage locations are provided to the blob stream 508 for retrieval of the read data.

In various implementations, a snapshot may be taken before all of the delta page file tables 512 have been cross-merged into the latest blob anchor. In such a case, following the snapshot, additional cross merges are performed for the prior blob anchor version until no page ranges of that version exist in the memory table 504 or the delta page file tables 512. In other implementations, a special form of cross-merge, called a bullet cross-merge, may force all of the address ranges for a certain blob to be merged from the delta page file tables 512 into the corresponding blob anchor. This can be performed prior to taking the snapshot so that no remaining cross-merging is necessary for the prior blob anchors.

Example Writes

In FIG. 10, a few small example writes are shown for illustration. Data for addresses 0-2048 is stored in extent 604-1. A corresponding index row is then created where the page range start is 0, the page range end is 2048, and the data pointer points to extent 1 with an offset of 0 and a length of 2048. Although the range from 0 to 2048 would appear to include 2049 addresses, the convention used here has an inclusive page range start and exclusive page range end. In other words, the data written corresponds to addresses 0 through 2047. The first index entry, which may be referred to as a range row, is labeled with 608-1.

Next, data for 2048-4096 is written. This data is stored in, to use a fictitious number for illustration, extent 29 (604-29). A range row 608-2 is created for the page range starting at 2048 and ending at 4096, indicating that the data is stored in extent 29 with an offset of 0 and a length of 2048. Next, data for 4096-6144 is written. The data is stored in, using another fictitious number, extent 87 (604-87). A corresponding range row 608-3 indicates the page range from 4096 to 6144 can be found at extent 87 with an offset of 0 and a length of 2048.

In FIG. 11A, assume that the range row 608-1 has already been merged in anchor 640-0 to anchor tree 644-1. Further, range rows 608-2 and 608-3 are part of a delta page file table 648. A cross-merge operation may update anchor tree 644-1 to be anchor tree 644-2. The anchor tree 644-2 now includes all three of the range rows.

In FIG. 11B, an alternative outcome of cross-merging maintains anchor tree 644-1 as is and adds a second anchor tree 652. This second anchor tree 652 may be created because the first anchor tree 644-1 has a currently pending operation, such as garbage collection. In a practical implementation, an anchor tree with millions of page ranges may cause so much write amplification upon a merge that it is more efficient to first create a second tree with no write amplification and only merge with the root tree at a later time.

In FIG. 12, the eventual merge, called an anchor merge, of the first anchor tree 644-1 and the second anchor tree 652 results in a new first anchor tree 644-3. Note that the anchor tree 644-3 may be identical to the anchor tree 644-2. The process of arriving at the same anchor tree, however, is different.

Overlapping Range Writes

In FIG. 13, a more complicated scenario is shown in which writes have overlapping address ranges. Beginning with a write for data in addresses 0-2048, the user data is stored in extent 704-1. A range row 708-1 indicates that the page range from 0-2048 is stored in extent 1 with an offset of 0 and a length of 2048.

Next, a write for addresses 1024-2048 is performed with data being stored in the fictitious extent 71 (704-71). In this example, extent 71 (704-71) already includes data 712 so the data 716 for addresses 1024-2048 is stored subsequent to the data 712. Therefore, a range row 708-2 indicates that the page range from 1024-2048 is stored at extent 71 with an offset of 1024 and a length 1024.

Next, a write of data for 1024-1536 is performed. The data is stored in fictitious extent 124 (704-124). Therefore, a resulting range row 708-3 indicates that the page range starting at 1024 and ending at 1536 is stored at extent 124 with an offset of 0 and a length of 512. For illustration only, the third write arrived with data only for 1024-1032. This may be below a level of granularity accepted by the cloud storage system or expected of a virtual disk. Therefore, the size of the data may be rounded up to a certain minimum size, such as 512 bytes.

In some implementations, the storage system will take the new eight bytes and combine them with the remaining 504 bytes from the data 716 when writing into extent 124 (704-124). In other implementations, the operating system of the virtual machine that is sending data to the virtual disk will be relied on to send data in 512 byte increments.

If data is sent in 512 byte increments, the actual values stored in the range rows 708 may be divided by 512. This may save 9 bits for each value stored. In other words, a page range start and end of 1024 and 1536 can physically be stored as 2 and 3, respectively.

Because the second write includes new data for 1024-2048, a portion of the data from the first write, stored in extent 1 704-1, is now obsolete. The data that is obsolete is indicated at 720 with cross-hatching for illustration. However, while this data is obsolete, the extent 704-1 is read-only and therefore the obsolete data 720 has not been overwritten or otherwise marked as obsolete. Instead, the second range row 708-2 is consulted to identify that newer data is available in extent 71 704-71.

Similarly, because new data has been received for addresses 1024-1536, data 724 in extent 71 (704-71) is now obsolete. Because the range rows 708-1 and 708-2 point to data that is partially invalid, when merging two or more of the range rows 708, the portions of data that are valid need to be separated from the portions that have been superseded.

In FIG. 14A, a blob anchor 740 includes anchor tree 744, which includes the range row 708-1 of FIG. 13. Further, delta page file tables 748 and 752 include the range rows 708-2 and 708-3, respectively, of FIG. 13. When the delta page file tables 748 and 752 are cross-merged into the anchor tree 744, an anchor tree 744-2 results. Note that the length of the data in extent 71 is now listed as being only 512 bytes long and that the length of the data in extent 1 is now listed as being only 1024 bytes long. This is as a result of the range breakdown, in which range rows are adjusted to point to the subsets of data that are still valid.

In FIG. 14B, alternatively, the cross-merge may result in a second anchor tree 760 being created. For example, the second anchor tree 760 may be created because an operation on the anchor tree 744 was ongoing or to avoid write amplification caused by adding range rows to the anchor tree 744. Creating the anchor tree 760 involved range breakdown because of the overlapping address ranges of the range rows 708-2 and 708-3.

In scenarios where a second tree (such as the second tree 760 of FIG. 14B) is created, an anchor merge may later merge the second anchor tree 760 into the root anchor tree 744. Such an anchor merge is shown in FIG. 15 and results in root anchor tree 744-3. As with the simple example where no breakdown occurred (FIG. 12), the anchor tree 744-3 is equivalent to the anchor tree 744-2 of FIG. 14A. In other words, the eventual state is the same regardless of whether an additional anchor was originally created or not.

Snapshot

In FIG. 16, a simple example of a snapshot begins with blob anchor 800-0, which includes anchor trees 804-1 and 804-2. Blob anchor 800-0 corresponds to an initial version, version 0, of the blob. For illustration, the anchor trees 804-1 and 804-2 include the range rows 708-1 and 708-2, respectively, of FIG. 13. When a snapshot is taken, a new blob anchor 800-1 is created for version 1 of the blob. The anchor trees 804-1 and 804-2 are inherited by the blob anchor 800-1 and are labeled as 804-3 and 804-4.

In FIG. 17, while the blob anchor 800-0 cannot be modified, an anchor merge can be performed to reduce the number of anchor trees toward an eventual single root anchor tree. The depicted anchor merge combines the anchor trees 804-1 and 804-2 in the blob anchor 800-0 to reach anchor tree 804-5.

Also in FIG. 17, a delta page file table 820 is shown and includes the range row 708-3 of FIG. 13, though the version number is 1 because in this illustration the write occurred after a snapshot. A cross-merge is performed to merge the delta page file table 820 into the blob anchor 800-1. The cross-merge creates a new anchor tree 804-6 to hold the range rows of the delta page file table 820.

One possible optimization is visible in this example. Because the anchor trees 804-3 and 804-4 of the blob anchor 800-1 were inherited from the anchor trees 804-1 and 804-2, respectively, of the blob anchor 800-0, and are therefore identical, the result of merging each pair of anchor trees should be the same. Therefore, the result of the anchor merge (anchor tree 800-5) can be used to replace the anchor trees 804-3 and 804-4 of the blob anchor 800-1. In other words, a single anchor merge operation can effectively merge the anchor trees 804-3 and 804-4 as well as the anchor trees 804-1 and 804-2.

In FIG. 18, an anchor merge is shown in which the anchor trees 804-3 and 804-4 are merged into a new root anchor 804-7. For example, anchor tree 804-6 may have been undergoing an operation (such as a cross-merge) and therefore the anchor merge excluded the anchor tree 804-6.

If the anchor tree 804-6 were not undergoing another operation, all three of the anchor trees 804-3, 804-4 and 804-6 might be merged together at the same time, as shown in FIG. 19. A resulting root anchor tree 804-8 includes the three ranges created by range breakdown.

Block Diagram

In FIG. 20, an example table server 900 includes a memory table subsystem 904 that receives and stores addresses corresponding to write data. Meanwhile, the write data is stored by a stream write subsystem 908 into the stream layer (see 420 of FIG. 7). The write addresses may also be stored by a log subsystem 912. If a partition needs to be reloaded by the table server 900, the logs of writes can be replayed from the log subsystem 912 to rebuild the corresponding memory table in the memory table subsystem 904. The memory table subsystem 904 stores the addresses in memory, such as volatile random access memory (RAM), with relatively fast random write speed and relatively fast random write speed. This is in contrast with technologies such as flash memory, in which random write speed is much lower than sequential write speed because entire blocks of data need to be rewritten in order to make small writes.

An index management system 916 controls performance of a checkpoint to incorporate the index entries in the memory table subsystem 904 to delta page file tables in a delta table subsystem 920. The index management system 916 controls a cross-merge operation to merge delta page file tables from the delta table subsystem 920 into a file table subsystem 924.

In response to a read request specifying read addresses, a read iterator 928 parses the index data of the memory table subsystem 904, the delta table subsystem 920, and the file table subsystem 924 to determine where the latest data corresponding to the requested addresses is stored. The read iterator 928 then requests that a stream read subsystem 932 provides the data from the corresponding addresses in response to the read request. Together, the read iterator 928 and the stream read subsystem 932 may be referred to as a read system 934.

The index management system 916 actuates a garbage collection system 936, which reads user data from underutilized extents in the stream layer and writes that data to new extents. These new extents will be, at least initially, closer to fully-utilized. The table server 900 may perform the operations described in FIGS. 21-23. In other implementations, some or all of the functionality described in FIGS. 21-23 may be performed by another entity in the cloud storage system.

Flowcharts

Figure 21:
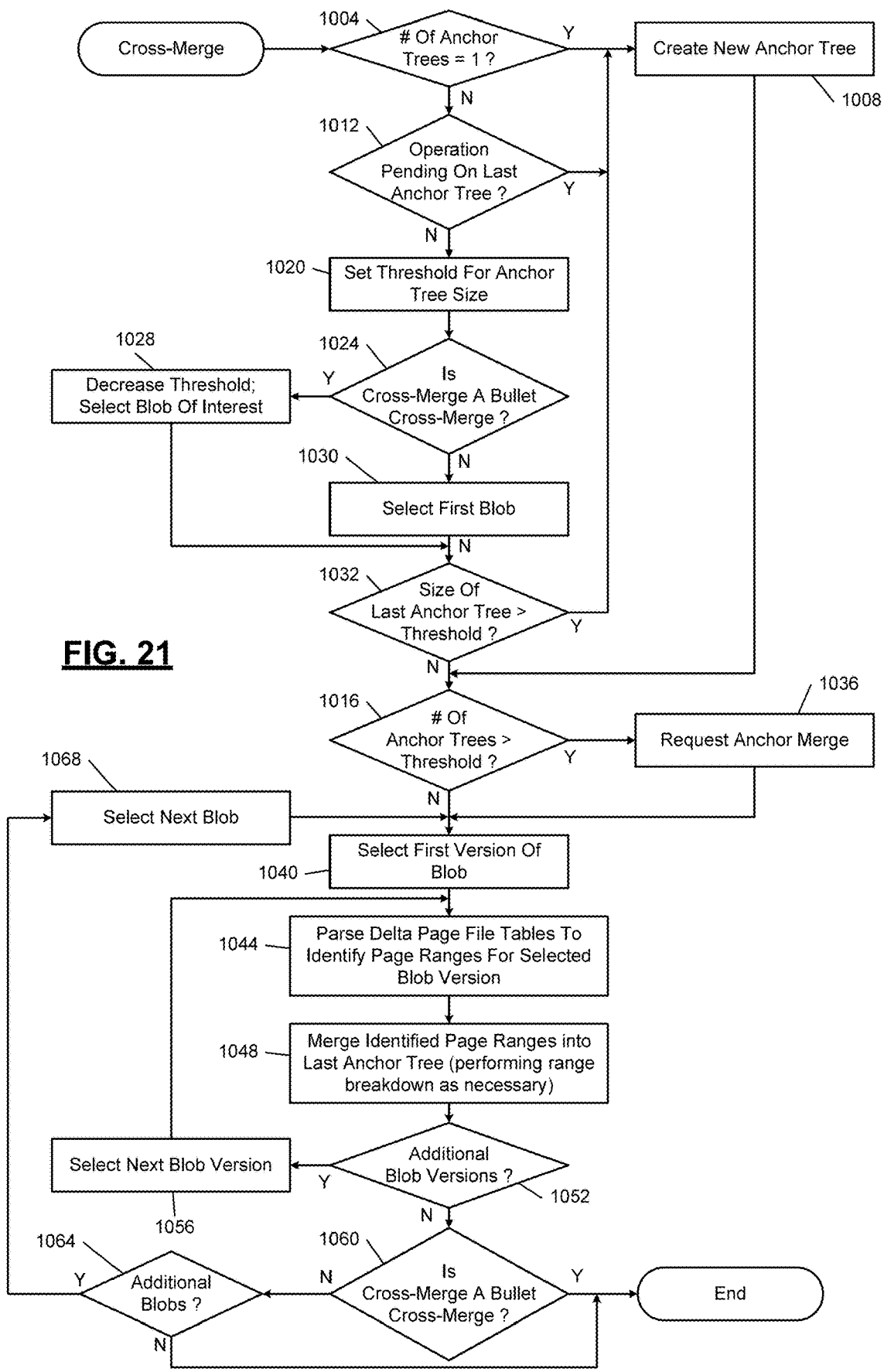
FIG. 21 is a flowchart depicting example cross-merge operation.

In FIG. 21, cross-merge operation begins at 1004. If the number of anchor trees is equal to 1, control transfers to 1008 to create a new anchor tree. In other words, cross-merge never merges delta page file tables directly into a root anchor tree. If the number of anchor trees is greater than 1, control transfers to 1012. After the new anchor tree is created at 1008, control transfers to 1016.

At 1012, control determines whether there is an operation pending on the last anchor tree. If so, control transfers to 1008 to create a new anchor tree; otherwise, control transfers to 1020. At 1020, control sets a threshold for anchor tree size. For example, this may be a predetermined value.

At 1024, control determines whether this cross-merge is a bullet cross-merge. If so, control transfers to 1028; otherwise, control transfers to 1030. A bullet cross-merge is a special cross-merge that is solely concerned with a single blob. For example, a copy command for that blob may be waiting to execute. The bullet cross-merge, therefore, merges only the delta page file table entries corresponding to that blob and leaves the remaining entries in the delta page file tables.

At 1028, control decreases the threshold and continues at 1032. The threshold is decreased to make it more likely that a bullet cross-merge will create a new anchor tree. This ensures that the bullet cross-merge encounters low latency since bullet cross-merges are generally invoked in response to customer requests to copy blobs. The distributed storage system may be configured to reduce latency for customer requests. Control also selects the blob of interest to the bullet cross-merge. Control then continues at 1032.

At 1030, control selects the first blob of the blobs to be parsed by the cross-merge. For example, the first blob may be indicated by the first row in the present partition of the XTable. Control then continues at 1032. At 1032, if the size of the last anchor tree is greater than the threshold, control transfers to 1008 to create a new anchor tree; otherwise, control continues at 1016.

At 1016, if the number of anchor trees is greater than a threshold, control transfers to 1036; otherwise, control transfers to 1040. At 1032, control requests an anchor merge, described in more detail in FIG. 22. Control then continues at 1040. At 1040, control selects a first version of a first blob. At 1044, control parses the delta page file tables to identify page ranges for the selected blob version. At 1048, control merges the identified page ranges into the last anchor tree of the anchor for the selected blob version, performing range breakdown as necessary. At 1052, if there are additional blob versions for the selected blob, control transfers to 1056; otherwise, control transfers to 1060. At 1056, control selects the next version of the selected blob and returns to 1044.

At 1060, if the cross-merge is a bullet cross-merge, then all versions of the blob of interest have been processed and control ends; otherwise, control transfers to 1064. At 1064, control determines whether there are additional blobs in the partition. If so, control transfers to 1068, where the next blob is selected and control continues at 1040. Otherwise, if there are no additional blobs to merge on, control ends.

Figure 22:
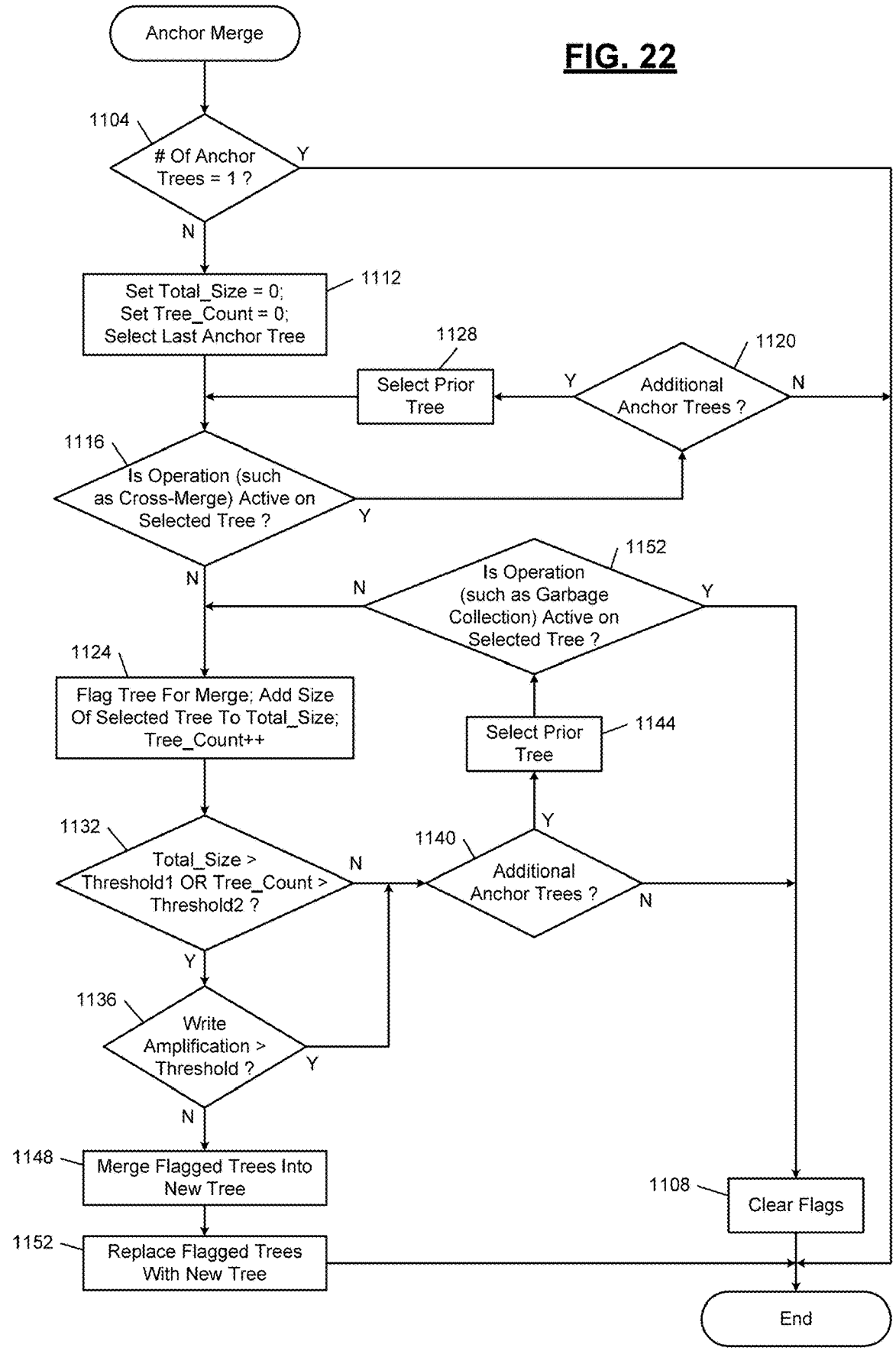
FIG. 22 is a flowchart depicting example anchor merge operation.

In FIG. 22, anchor merge operation begins at 1104. If the number of anchor trees is equal to 1, anchor merge is not necessary and, therefore, control ends; otherwise, control transfers to 1112. At 1112, control initializes a Total_Size variable to zero and a Tree_Count variable to zero. Control then selects the last (most-recently-created) anchor tree.

At 1116, control determines whether an operation (likely cross-merge) is active on the selected tree. If so, control transfers to 1120; otherwise, control transfers to 1124. At 1120, control determines whether there are additional anchor trees. If so, control transfers to 1128; otherwise, there are no anchor trees currently available to be merged and control ends. At 1128, control selects the prior anchor tree (the one created previous to the currently-selected anchor tree) and continues at 1116.

At 1124, control flags the selected tree for anchor merging. Control adds the size of the selected tree to the Total_Size variable and increments the Tree_Count variable. Control continues at 1132, where if Total_Size is greater than a first threshold or Tree_Count is greater than a second threshold, control transfer transfers to 1136; otherwise, control transfer to 1140. At 1140, neither threshold has yet been met for anchor merge and, therefore, control determines whether there are additional anchor trees. If there are additional anchor trees to evaluate, control transfers to 1144; otherwise, control transfers to 1108. At 1108, control clears anchor merge flags from all trees and then ends.

At 1144, control selects the prior tree and continues at 1152. At 1152, control determines whether an operation (likely garbage collection) is active on the selected tree. If so, the selected tree cannot be used for anchor merge and, therefore, control transfers to 1108. Otherwise, if no operation is active, control transfers to 1124.

At 1136, control determines whether the write amplification resulting from the currently-pending anchor merge is greater than a threshold. If so, control transfers to 1140 to see if additional anchor trees can be added to reduce the write amplification. If the write amplification is less than the threshold, control transfers to 1148. At 1148, control merges the flagged trees into a new tree and, at 1152, control replaces the flagged trees with the new tree. Control then ends.

Figure 23:
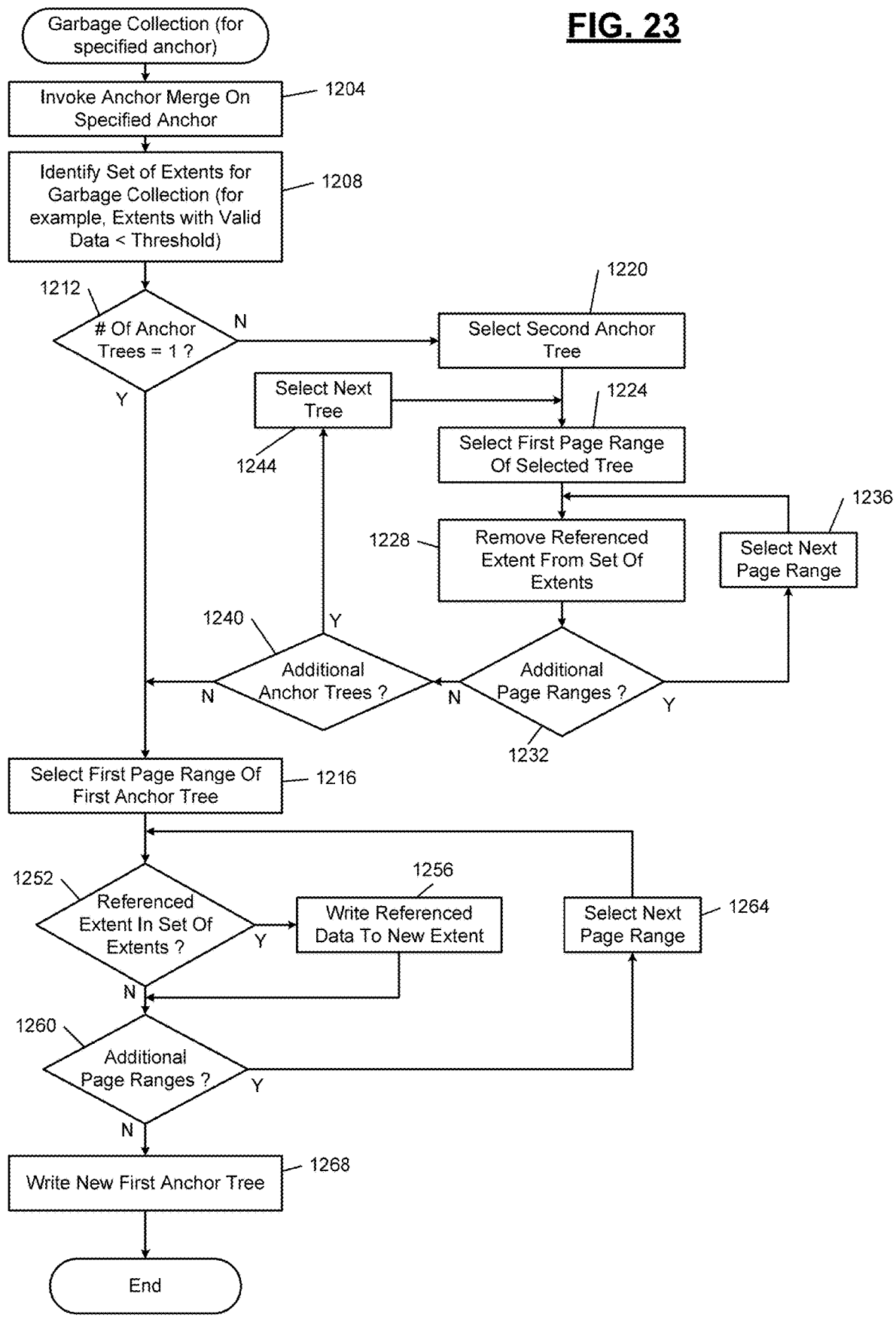
FIG. 23 is a flowchart depicting example garbage collection operation.

In FIG. 23, example garbage collection for a specified anchor begins at 1204. Control invokes an anchor merge on the specified anchor. If garbage collection had been waiting for an anchor merge to complete, control may skip invoking another anchor merge. At 1208, control identifies a set of extents eligible for garbage collection. For example, this may be a list of extents whose the amount of valid data in the extent is less than a threshold. The threshold may be expressed as a percentage of total extent storage space, such as a value of 50%. The set of extents eligible for garbage collection may be maintained for the partition so that the set of extents in 1208 can simply be read from a storage location.

At 1212, if the number of anchor trees is equal to 1, control transfer to 1216; otherwise, controls transfers to 1220. If there is more than one anchor tree, garbage collection may wish to avoid rewriting extents that are pointed to by non-root anchor trees. In other words, when garbage collection is configured to operate only on the root anchor tree, modifications should not be made to extents that are also pointed to by other anchor trees. If such extents were modified by garbage collection, the corresponding non-root anchor trees would also have to be modified.

Therefore, at 1220, control selects the second anchor tree and continues at 1224. At 1224, control selects the first page range of the selected anchor tree. At 1228, control removes the extent referenced by the selected page range from the set of extents for garbage collection. Control continues at 1232.

If, at 1242, there are additional page ranges, control transfers to 1236; otherwise, control transfers to 1240. At 1236, control selects the next page range of the selected tree and continues at 1228. At 1240, control determines whether there are additional anchor trees. If so, control transfers to 1244; otherwise, control transfers 1216. At 1244, control selects the next tree and continues at 1224.

At 1216, control selects the first page range of the first anchor tree. At 1252, control determines whether the extent referenced by the selected page range is within the set of extents eligible for garbage collection. If so, control transfers to 1256; otherwise, control continues at 1260. At 1256, control writes the referenced data to a new extent and continues at 1260. At 1260, if there are additional page ranges within the selected anchor tree, control transfers to 1264; otherwise, control transfers to 1268. At 1264, control selects the next page range and continues at 1252. At 1268, control writes the new anchor tree, whose page ranges point to the newly-written data, to replace the prior root anchor tree.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term 'module' or the term 'controller' may be replaced with the term 'circuit.' The term 'module' may refer to, be part of, or include processor hardware (shared, dedicated, or group)

that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A method, implemented at a computer system that includes a processor, for performing a cross-merge within a distributed storage system, the method comprising:
   identifying a data structure that includes (i) a root anchor tree and (ii) an ordered set of anchor trees that are ordered based on their creation, such that a last anchor tree of the ordered set of anchor trees is most-recently created, the data structure storing index data for a set of objects stored in a non-volatile storage;
   creating a new anchor tree in the ordered set of anchor trees;
   identifying, from a set of delta tables, index data representing one or more objects that are stored on the non-volatile storage; and
   merging the index data representing the one or more objects into the new anchor tree.

2. The method of claim 1, wherein creating the new anchor tree is based on determining that the ordered set of anchor trees is empty.

3. The method of claim 1, wherein creating the new anchor tree is based on determining that there is an operation pending on the last anchor tree of the ordered set of anchor trees.

4. The method of claim 1, wherein creating the new anchor tree is based on determining that a size of the last anchor tree of the ordered set of anchor trees exceeds a threshold.

5. The method of claim 1, wherein:
   a particular object of the one or more objects encompasses data having a range of addresses, and is stored as a plurality of portions within the non-volatile storage, each portion of the plurality of portions including data for a respective range of addresses that is a proper subset of the range of addresses; and
   the index data representing the particular object includes, for each portion of the plurality of portions of the particular object, (i) data indicating the respective range of addresses, and (ii) a pointer to where the portion is stored in the non-volatile storage.

6. The method of claim 5, wherein merging the index data representing the one or more objects into the new anchor tree comprises performing a range breakdown.

7. The method of claim 1, wherein the index data representing the one or more objects comprises first index data representing a first version of a particular object, the method further comprising, after merging the first index data representing the first version of the particular object into the new anchor tree:

identifying, from the set of delta tables, second index data representing a second version of the particular object; and merging the second index data representing the second version of the particular object into the new anchor tree.

8. The method of claim 1, further comprising:
determining that a number of anchor trees in the ordered set of anchor trees exceeds a threshold; and
initiating an anchor merge.

9. The method of claim 1, wherein each object in the set of objects comprises one of a page blob or a file.

10. The method of claim 1, wherein the index data representing the one or more objects comprises a plurality of rows within the set of delta tables, each row of the plurality of rows representing a portion of an object of the one or more objects.

11. The method of claim 1, wherein the one or more objects comprises a plurality of objects.

12. The method of claim 1, wherein the one or more objects comprises only one object, and wherein the method further comprises one or more of:
stealing a garbage collection lock; or
generating metadata indicating that a merge was already performed for index data in the set of delta tables that corresponds to the object.

13. A computer system, comprising:
a processor; and
a computer-readable medium comprising processor-executable instructions that are executable by the processor to cause the computer system to at least:
identify a data structure that includes (i) a root anchor tree and (ii) an ordered set of anchor trees that are ordered based on their creation, such that a last anchor tree of the ordered set of anchor trees is most-recently created, the data structure storing index data for a set of objects stored in a non-volatile storage;
create a new anchor tree in the ordered set of anchor trees;
identify, from a set of delta tables, index data representing one or more objects that are stored on the non-volatile storage; and
merge the index data representing the one or more objects into the new anchor tree.

14. The computer system of claim 13, wherein creating the new anchor tree is based on at least one of:
determining that the ordered set of anchor trees is empty;
determining that there is an operation pending on the last anchor tree of the ordered set of anchor trees; or
determining that a size of the last anchor tree of the ordered set of anchor trees exceeds a threshold.

15. The computer system of claim 13, wherein:
a particular object of the one or more objects encompasses data having a range of addresses, and is stored as a plurality of portions within the non-volatile storage, each portion of the plurality of portions including data for a respective range of addresses that is a proper subset of the range of addresses; and
the index data representing the particular object includes, for each portion of the plurality of portions of the particular object, (i) data indicating the respective range of addresses, and (ii) a pointer to where the portion is stored in the non-volatile storage.

16. The computer system of claim 15, wherein merging the index data representing the one or more objects into the new anchor tree comprises performing a range breakdown.

17. The computer system of claim 13, wherein:
the index data representing the one or more objects comprises first index data representing a first version of a particular object; and
the processor-executable instructions are also executable by the processor to cause the computer system to, after merging the first index data representing the first version of the particular object into the new anchor tree:
identify, from the set of delta tables, second index data representing a second version of the particular object; and
merge the second index data representing the second version of the particular object into the new anchor tree.

18. The computer system of claim 13, wherein the index data representing the one or more objects comprises a plurality of rows within the set of delta tables, each row of the plurality of rows representing a portion of an object of the one or more objects.

19. The computer system of claim 13, wherein:
the one or more objects comprises only one object; and
the processor-executable instructions are also executable by the processor to cause the computer system to:
stealing a garbage collection lock; or
generating metadata indicating that a merge was already performed for index data in the set of delta tables that corresponds to the object.

20. A computer-readable medium comprising processor-executable instructions that are executable by a processor to cause a computer system to at least:
identify a data structure that includes (i) a root anchor tree and (ii) an ordered set of anchor trees that are ordered based on their creation, such that a last anchor tree of the ordered set of anchor trees is most-recently created, the data structure storing index data for a set of objects stored in a non-volatile storage;
create a new anchor tree in the ordered set of anchor trees;
identify, from a set of delta tables, index data representing one or more objects that are stored on the non-volatile storage; and
merge the index data representing the one or more objects into the new anchor tree.

* * * * *